(12) United States Patent
Kemp et al.

(10) Patent No.: US 7,054,727 B2
(45) Date of Patent: May 30, 2006

(54) METHOD OF MEASURING A PROPENSITY OF A VEHICLE TO ROLL OVER

(75) Inventors: Kevin Kemp, Walker, MI (US); Hamid Alper Oral, Grand Rapids, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 365 days.

(21) Appl. No.: 10/428,595

(22) Filed: May 2, 2003

(65) Prior Publication Data

US 2003/0230137 A1 Dec. 18, 2003

Related U.S. Application Data

(60) Provisional application No. 60/377,723, filed on May 3, 2002.

(51) Int. Cl.
G06F 7/00 (2006.01)
G06F 17/00 (2006.01)

(52) U.S. Cl. .............................. 701/29; 701/37; 701/69; 701/71; 701/82; 280/5.5

(58) Field of Classification Search .................. 701/29, 701/1, 36, 37, 38, 69, 71, 82; 280/5.5, 5.504, 280/5.505, 5.506, 5.507, 5.513

See application file for complete search history.

(56) References Cited

U.S. PATENT DOCUMENTS

| | | | |
|---|---|---|---|
| 3,837,221 A | 9/1974 | Odier | 73/124 |
| 4,992,943 A | 2/1991 | McCracken | 364/424.04 |
| 5,048,342 A | 9/1991 | Morelli | 73/669 |
| 5,111,685 A | 5/1992 | Langer | 73/117 |
| 5,177,998 A | 1/1993 | Monk | 73/65 |
| 5,189,920 A | 3/1993 | Martinez | 73/865.3 |
| 5,338,206 A | 8/1994 | Hupfer | 434/305 |
| 5,368,484 A | 11/1994 | Copperman et al. | 434/69 |

(Continued)

FOREIGN PATENT DOCUMENTS

WO    WO 3093781 A2 * 11/2003

OTHER PUBLICATIONS

Publication entitled *"The Advanced Daimler–Benz Driving Simulator"* reprinted from: Vehicle Computer Applications: Vehicle Systems and Driving Simulation (SP–1080); from SAE International; published in Mar. 1995; by Wilfried Käding and Friedrich Hoffmeyer of Daimler–Benz AG.

Publication entitled *"Vehicle Rollover Propensity Measurement Using a Novel Approach"* reprinted from: Vehicle Dynamics & Simulation, 2003 (SP–1778); from SAE International; published in Mar. 2003; by Hamid A. Oral, Kevin Kemp, Mark Hoenke, Yin Wen, Jeffrey Barber, and Ralph Palmer of Burke E. Porter Machinery Company.

(Continued)

*Primary Examiner*—William A. Cuchlinski, Jr.
*Assistant Examiner*—Olga Hernandez
(74) *Attorney, Agent, or Firm*—Van Dyke, Gardner, Linn & Burkhart, LLP

(57) ABSTRACT

A method of replicating a real-world vehicle rollover of a vehicle having wheels utilizing a vehicle testing apparatus having a support. The method includes positioning the vehicle on the support. Static properties of the vehicle are then determined. An initial set of forces and moments to be applied to the support are determined based upon at least the static properties. The support is actuated based upon the initial set of forces and moments to replicate the vehicle rollover. An actual response of the vehicle to the initial actuating of the vehicle testing apparatus is measured to determine dynamic properties of the vehicle. So long as all of the wheels remained on the support during the actuating of the vehicle testing apparatus, sets of forces and moments are continuously determined. The vehicle testing apparatus can be repeatedly actuated based upon the sets of forces and moments to further replicate the vehicle rollover.

24 Claims, 15 Drawing Sheets

U.S. PATENT DOCUMENTS

| | | | |
|---|---|---|---|
| 5,375,460 A | 12/1994 | La Belle | 73/117 |
| 5,657,227 A | 8/1997 | Freitag | 364/424.034 |
| 5,657,228 A | 8/1997 | Lee | 364/424.034 |
| 5,761,626 A | 6/1998 | Tascillo et al. | 701/29 |
| 6,079,258 A | 6/2000 | List et al. | 73/117.3 |
| 6,138,066 A | 10/2000 | Guo et al. | 701/38 |
| 6,192,745 B1 | 2/2001 | Tang et al. | 73/146 |
| 6,247,357 B1 | 6/2001 | Clayton, Jr. | 73/117 |
| 6,256,601 B1 | 7/2001 | Wipasuramonton et al. | 703/8 |
| 6,327,526 B1 | 12/2001 | Hagan | 701/33 |
| 6,360,145 B1 | 3/2002 | Robinson | 701/35 |
| 6,529,811 B1 | 3/2003 | Watson et al. | 701/45 |
| 6,654,671 B1 * | 11/2003 | Schubert | 701/1 |
| 6,714,848 B1 * | 3/2004 | Schubert et al. | 701/46 |
| 2002/0065591 A1 * | 5/2002 | Schubert et al. | 701/38 |
| 2003/0088349 A1 * | 5/2003 | Schubert et al. | 701/36 |
| 2003/0158633 A1 * | 8/2003 | Schubert | 701/1 |
| 2003/0230137 A1 * | 12/2003 | Kemp et al. | 73/117 |
| 2004/0003655 A1 * | 1/2004 | Kemp et al. | 73/118.1 |
| 2004/0010383 A1 * | 1/2004 | Lu et al. | 702/41 |
| 2004/0030473 A1 * | 2/2004 | Lu et al. | 701/36 |
| 2004/0030475 A1 * | 2/2004 | Lu et al. | 701/38 |
| 2004/0064236 A1 * | 4/2004 | Lu et al. | 701/70 |
| 2004/0064246 A1 * | 4/2004 | Lu et al. | 701/124 |
| 2004/0117085 A1 * | 6/2004 | Lu et al. | 701/36 |
| 2004/0133338 A1 * | 7/2004 | Verhagen et al. | 701/124 |
| 2004/0162654 A1 * | 8/2004 | Lu et al. | 701/38 |

OTHER PUBLICATIONS

Publication entitled *"Military Builds The Roadway Simulator To Speed Vehicle Dynamics, Powertrain, and Durability Testing and Evaluation"* by Gregory Schultz, US Army Aberdeen Test Center and Carl Larsen, MTS Systems Corporation from the magazine *Road Warrior*.

Publication entitled *"Test Method For Simulating Vehicle Rollover"* reprinted from Progress in Safety Methodology (SP–1596); from SAE International; published Mar. 2001; by Mike Rossey of Autoliv North America.

"An Experimental Examination of Selected Maneuvers That May Induce On Road, Untripped Light Vehicle Rollover – Phase 1–A of NHTSA's 1997–1998 Vehicle Rollover Research Program," by the U.S. Department of Transportation, National Highway Traffic Safety Administration, DOT HS 809 357, Aug. 2001.

"An Experimental Examination of Selected Maneuvers That May Induce On–Road Untripped Light Vehicle Rollover – Phase II of NHTSA's 1997–1998 Vehicle Rollover Research Program," by the U.S. Department of Transporation, National Highway Traffice.Safety Administratin, DOT HS 808 977, Jul. 1999.

"Measured Vehicle Inertial Parameters–NHTSA's Data Through Nov. 1998," Copyright ®1999 Society of Automotive Engineers, Inc.

"The General Motors Driving Simulator," SAE Technical Paper Series 940179, International Congress & Exposition, Detroit, Michigan, Feb. 28–Mar. 3, 1994.

"Vehicle Stability Control in Limit Cornering y Active Brake," SAE Technical Paper Series 960487, International Congress & Exposition, Detroit, Michigan, Feb. 26–29, 1996.

Erik Dahlberg, "Commercial Vehicle Stability –Focusing on Rollover," Vehicle Dynamics Department of Vehicle Engineering, Royal Institute of Technology, Stockholm, Sweden, 2001.

* cited by examiner

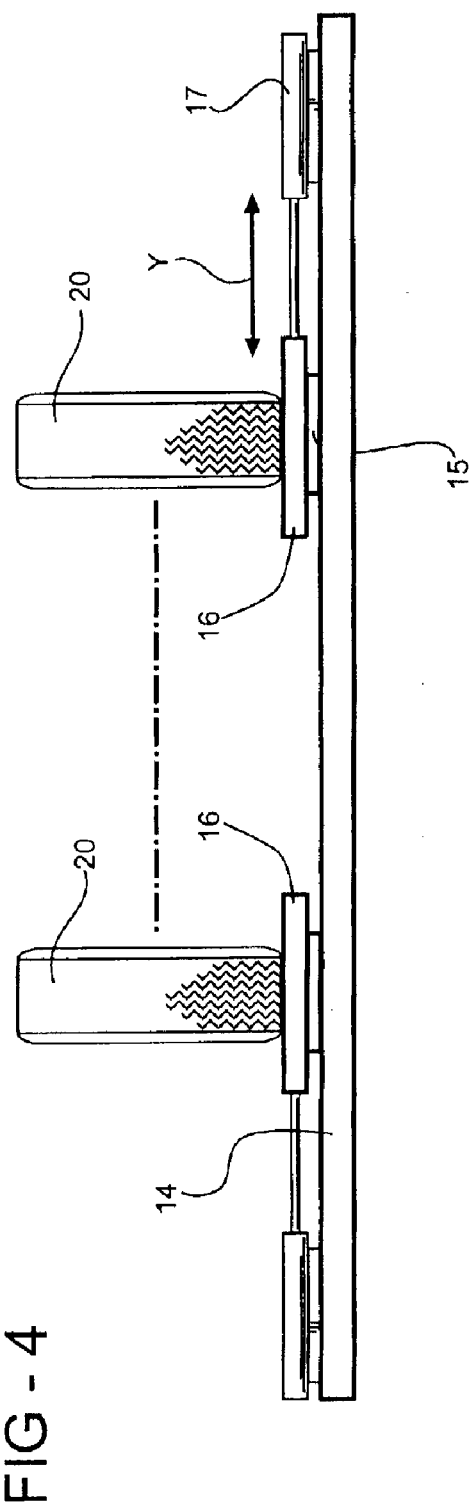
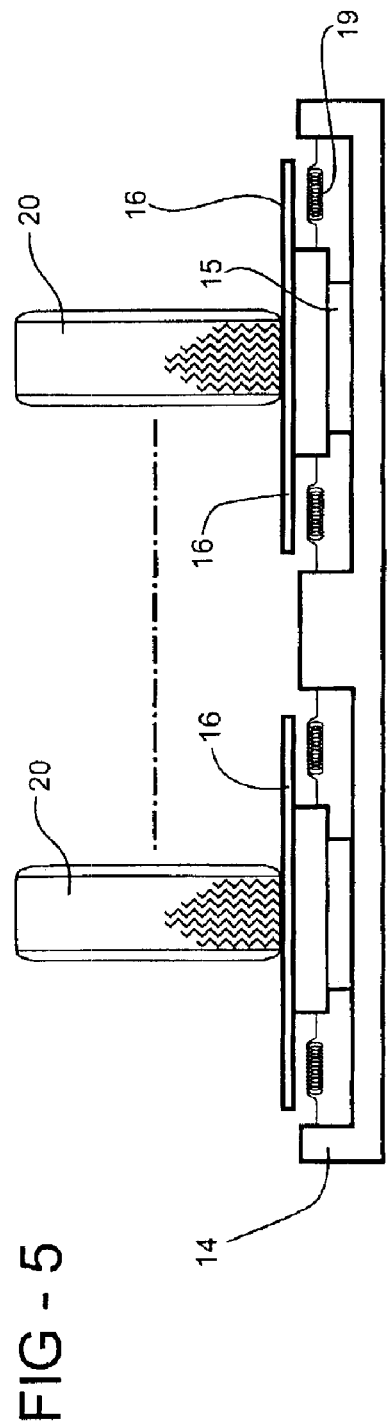
FIG-4
FIG-5

METHOD OF MEASURING A PROPENSITY OF A VEHICLE TO ROLL OVER

RELATED APPLICATION

The subject application claims priority to and all the benefits of U.S. Provisional Patent Application Ser. No. 60/377,723, which was filed on May 3, 2002.

BACKGROUND OF THE INVENTION

1. Field of the Invention

The subject invention relates to methods for testing dynamic properties of a vehicle, particularly a propensity of the vehicle to roll over during operation.

2. Description of the Prior Art

Rollover accidents have been one of the greatest vehicle safety concerns for decades, according to the National Highway Traffic Safety Administration (NHTSA). In fact, rollover accidents are the largest cause of fatalities in passenger car and light truck accidents. Rollover accidents have also been the subject of intense litigation over recent years, giving rise to a need for better alternatives to traditional testing of the propensity of vehicles to rollover.

A common standard used by the NHTSA for the propensity of vehicles to rollover is Static Stability Factor, or SSF. As the name implies, the SSF is a static measurement of a vehicle. The SSF is based on one half of the average front and rear track-width divided by the total vehicle center of gravity and height. The SSF is useful as one of many factors in determining the propensity of vehicles to rollover, but alone is insufficient. The SSF assumes that vehicles act like rigid boxes not taking into account the compliance of wheels and suspensions.

Currently, there are several vehicle testing apparatuses that purport to dynamically measure the propensity of vehicles to rollover in a controlled environment. Although such apparatuses may provide useful results for particular properties of vehicles, the apparatuses cannot accurately measure the propensity of vehicles to rollover. One reason for this is that apparatuses of the prior art have limited capability and cannot exert compound dynamic forces on vehicles akin to an actual vehicle rollover situation. Another reason for the lack of accuracy of the prior art vehicle testing apparatuses is that the methods used for performing the tests do not attempt to pinpoint a threshold force that causes wheel lift-off. For example, a centrifuge device can be used to produce lateral accelerations. The operation requires that a certain speed to be reached and then the vehicle is released to roll. Hence, any event that is simulated is only what happens after the roll is initiated. Also since a centrifuge device is used, any developed lateral accelerations are not perfectly perpendicular to the vehicle longitudinal axis and varies by the vehicle's length. Another example is a flat track road simulator which can produce roll, pitch and vertical motions of the subject vehicle. However, road simulators lack the lateral acceleration which can be an important factor in a rollover accident. In another example, a vehicle sled allows vehicles to be propelled laterally along a horizontal axis. The vehicle sled is propelled and abruptly stopped to trigger a rollover of the vehicle. The pressure used to propel the sled is not controlled accurately to match the lateral acceleration to any particular rollover maneuver, but rather is aimed to roll the vehicle over following a trip. The vehicle sled cannot exert compound dynamic forces on vehicles akin to an actual rollover situation and thus does not account for many factors that have an effect on the propensity of vehicles to rollover.

Although the propensity of vehicles to rollover can be tested through real-world driving maneuvering on test tracks, such tests have proven to be unrepeatable and unpredictable and therefore cannot be standardized, unless prohibitively expensive methods are used which would be applicable to only a limited number of rollover maneuvers. In addition, a great deal of real-world vehicle rollover situations are tripped by an obstacle, which can either be an object in a roadway or a particular structure of the roadway, such as curbs, potholes, etc. As the vehicle is turning or sliding sideways on the roadway, a side of the wheel encounters the obstacle. The side of the wheel catches on the obstacle, thus creating a fulcrum at the wheel. Vehicle rollover occurs when the moment of lateral forces around a fulcrum overcomes the moment created by the weight of the vehicle about the same fulcrum point. It is almost impossible to formulate a maneuver that will implement a tripped vehicle rollover situation in a repeatable manner on the test track due to uncontrollability and unobservability of several parameters.

Another issue with vehicle rollover testing is that each vehicle, even if of the same model, is slightly different. Such slight differences, no matter how small, can have an effect on the propensity of the vehicle to rollover. Current methods do not take this into account and generally do not test static and dynamic properties of each vehicle before performing the vehicle rollover testing. Moreover, all necessary tests cannot be performed on one testing apparatus. The resulting testing is skewed because of the slight differences, which also affect repeatability of the tests.

Thus, there remains an opportunity for a vehicle testing method for measuring the propensity of vehicles to rollover that produces repeatable results and that measures a point of wheel lift-off similar to real-world forces exerted on vehicles during tripped and untripped rollover situations without damaging the vehicle. Furthermore, there remains an opportunity to test the static and dynamic properties of each vehicle prior to testing the propensity of the vehicle to rollover for enhancing repeatability of the results.

SUMMARY OF THE INVENTION AND ADVANTAGES

The subject invention provides a method of replicating a real-world vehicle rollover of a vehicle having wheels. The method is performed on a vehicle testing apparatus that has a support. The vehicle rollover is defined by at least one of the wheels lifting off of the support. The vehicle is positioned on the vehicle testing apparatus such that each of the, wheels of the vehicle are supported on the support. Static properties of the vehicle are then determined. An initial set of forces and moments to be applied to the vehicle testing apparatus are determined based upon the determined static properties. The vehicle testing apparatus is actuated based upon the initial set of forces and moments to replicate the vehicle rollover. An actual response of the vehicle to the initial actuating of the vehicle testing apparatus is measured to determine dynamic properties of the vehicle. A second set of forces and moments to be applied to the vehicle testing apparatus are determined so long as all of the wheels remained on the support during the initial actuating of the vehicle testing apparatus. The second set of forces and moments are based upon the determined initial set of forces and moments, the measured actual response of the vehicle to the initial actuating of the vehicle testing apparatus, and the determined dynamic properties of the vehicle. The vehicle testing apparatus is actuated based upon the second set of forces and moments to further replicate the vehicle rollover.

The method of the subject invention tests the propensity of vehicles to rollover by measuring a point of wheel lift-off similar to real-world forces exerted on vehicles during rollover situations without damaging the vehicle. By not damaging the vehicle, the method produces repeatable results. The method also provides for measuring the particular static and dynamic properties of each vehicle prior to testing to customize the testing for each vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a planar view of an alternative support design of the vehicle testing apparatus;

FIG. 5 is a planar view of another alternative support design of the vehicle testing apparatus;

DETAILED DESCRIPTION OF THE INVENTION

Figure 1:
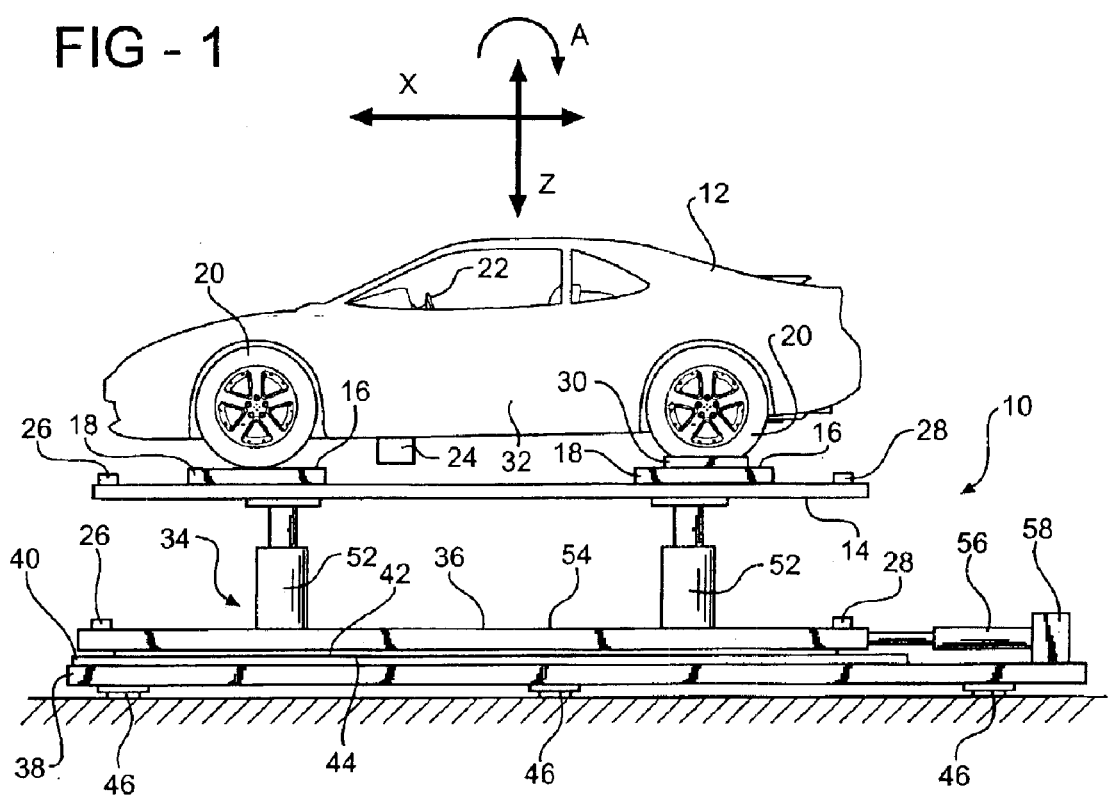
FIG. 1 is a side view of a vehicle testing apparatus in accordance with the subject invention.
Figure 3:
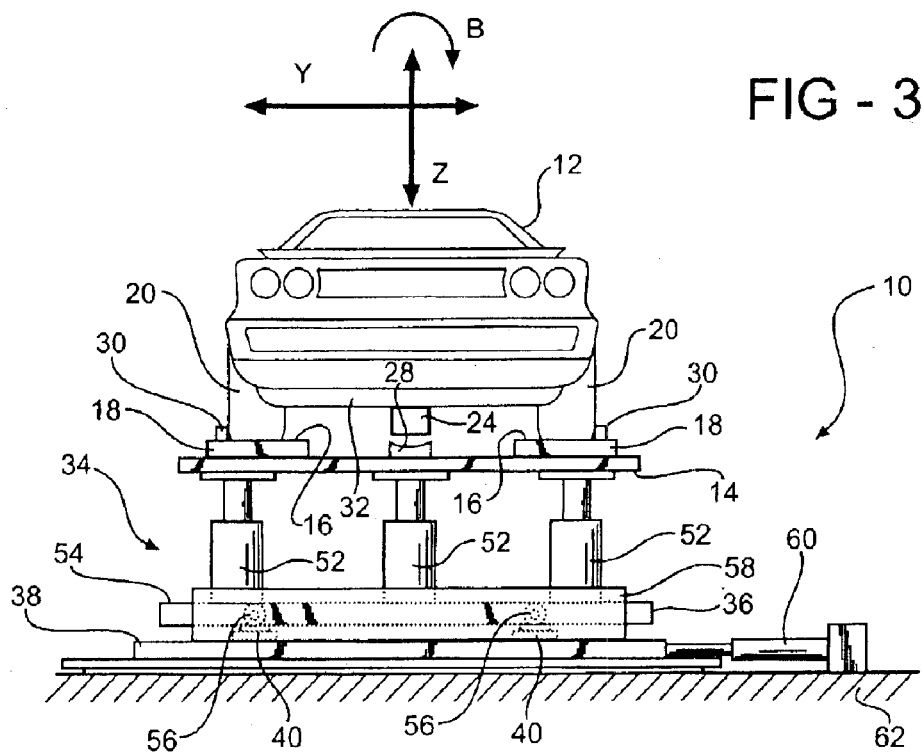
FIG. 3 is a rear view of the vehicle testing apparatus of FIG. 1.
Figure 2:
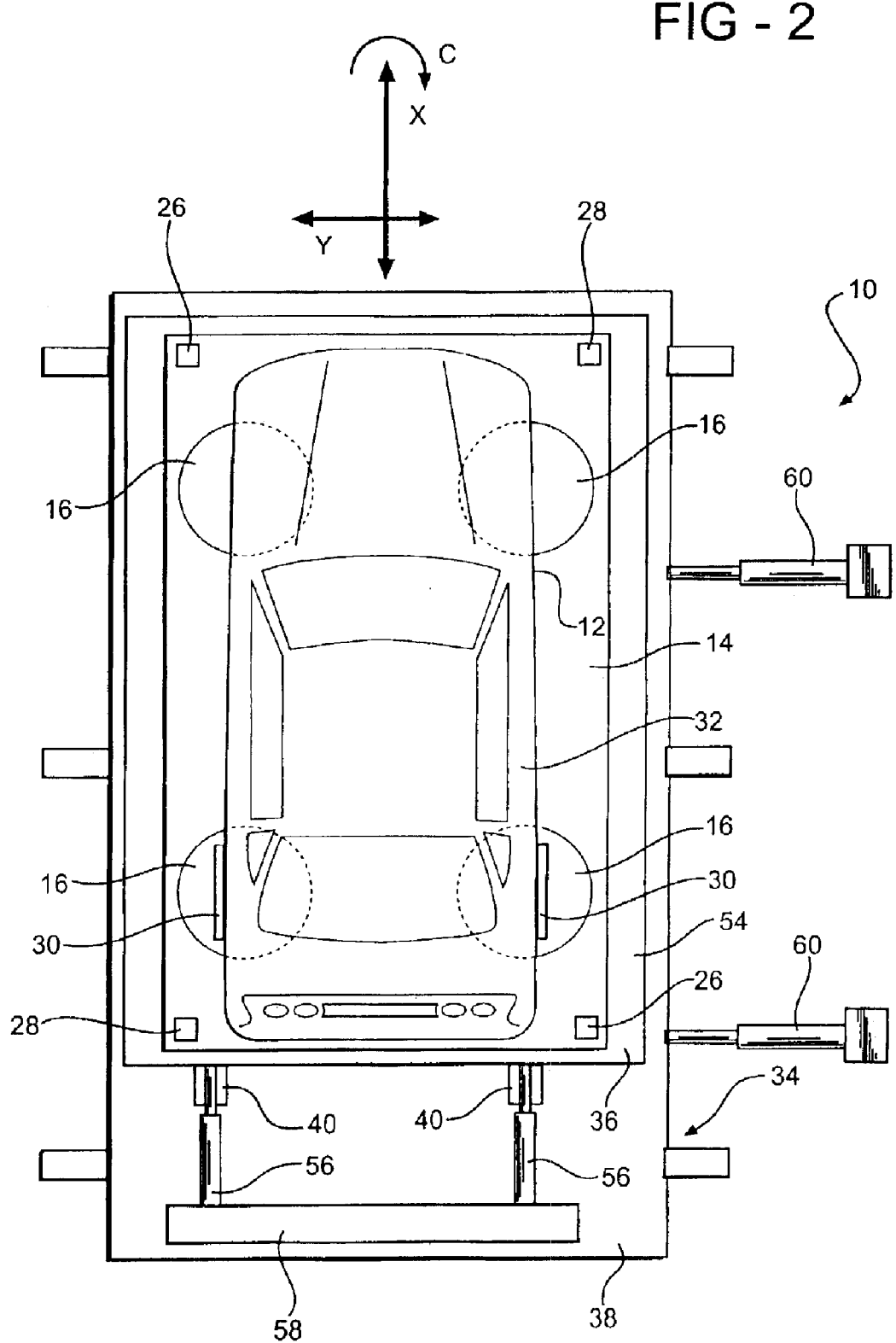
FIG. 2 is a top view of the vehicle testing apparatus of FIG. 1.

Referring to the Figures, wherein like numerals indicate like or corresponding parts throughout the several views, a vehicle testing apparatus used in a method of the subject invention is generally shown at 10 in FIGS. 1–3. The vehicle testing apparatus 10 is useful for subjecting a vehicle 12 to a compound force akin to a force experienced by the vehicle 12 during real-world tripped or untripped rollover situations. Thus, the vehicle testing apparatus 10 is particularly useful for testing a propensity of the vehicle 12 to rollover, preferably defined by at least one wheel 20 of the vehicle 12 lifting off of the vehicle testing apparatus 10. It should be appreciated that any suitable type of vehicle having any number of wheels could be tested using the testing apparatus of the subject invention.

Figure 14:
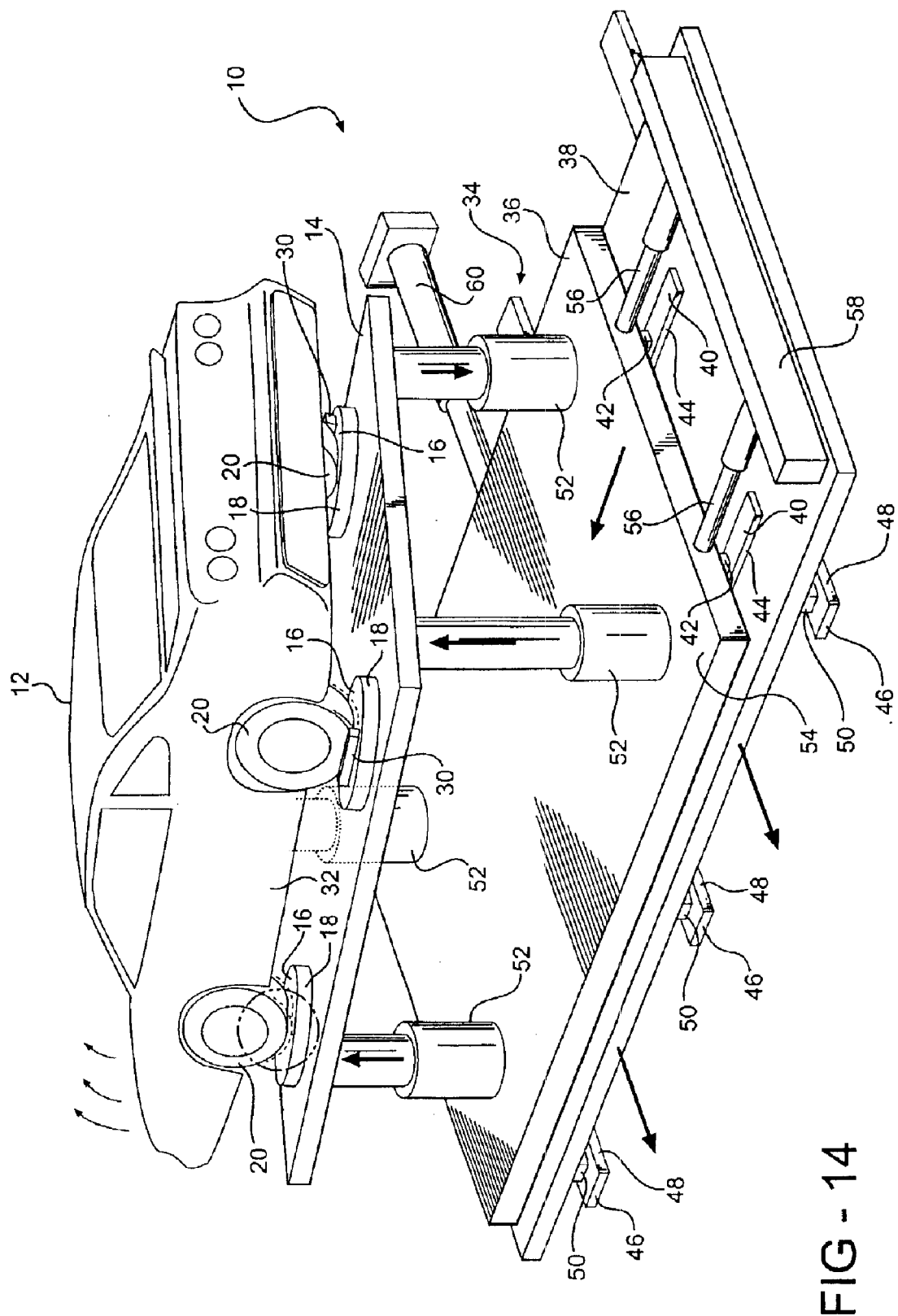
FIG. 14 is a perspective view of another embodiment of the vehicle testing apparatus during a rollover maneuver showing wheel lift-off.
Figure 15:
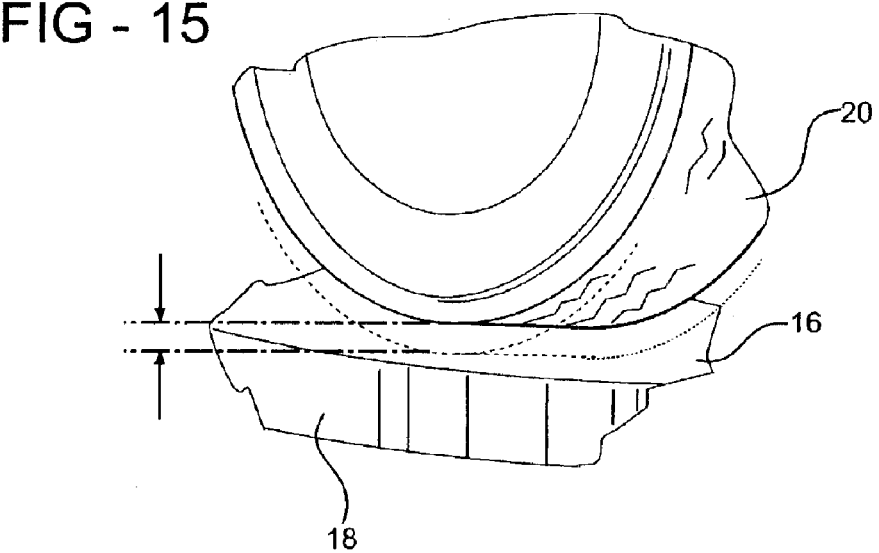
FIG. 15 is an enlarged fragmentary view of a wheel of the vehicle lifting off of the vehicle testing apparatus of FIG. 14.

The vehicle testing apparatus 10 includes a support 14 for supporting the vehicle 12. The support 14 includes a number of contact surfaces 16 for receiving and supporting the wheels 20 of the vehicle 12. Each of the contact surfaces 16 includes a sensor 18 for measuring a static weight of the vehicle 12 and a load applied to each wheel 20 in three axes X, Y, Z during movement of the support 14. For example, when performing a vehicle rollover maneuver, as shown in FIG. 14, each sensor 18 constantly measures a weight distribution of the vehicle 12 on the corresponding contact surface 16. As discussed in greater detail below, rollover maneuvers can either trip or not trip a vehicle. During a tripped rollover maneuver, a measurement of no weight distributed on a particular sensor 18 indicates wheel lift-off, as shown in FIG. 15, from the contact surface 16 associated with that sensor 18. When excessive lateral wheel slip is expected, such as on-road untripped rollover maneuver tests, load cells can be placed on a wheel rim along a spindle axis. When there is limited slip allowed, there are several ways of sensing wheel lift-off such as using proximity sensors to detect the clearance of the vehicle 12 to the support 14, using angular displacement sensors, or the like. The sensor 18 would, by itself, not accurately detect wheel lift-off during wheel slip because the measured force on the sensor 18 during slip is zero. Hence, this configuration allows a load measurement regardless of the position of the wheels 20 on the support 14. In this configuration, the contact surfaces 16 are either not used or increased in length laterally to accommodate vehicle slip. Measuring vehicle slip is important because many vehicles slip or skid before rolling over during untripped rollover maneuvers.

Referring to FIG. 4, an alternative support design is illustrated. In particular, each contact surface 16 may be mounted on a track 15 for allowing movement in at least one of the three axes X, Y, Z. The contact surfaces 16 may be controlled by contact surface actuators 17 to replicate a specific load profile on each wheel 20 during real-world driving situations. The contact surface actuators 17 are shown moving the contact surfaces 16 along a second axis Y, but it is to be appreciated that the contact surface actuators 17 can be positioned to move the contact surfaces along any of the three axes X, Y, Z and combinations thereof. Turning to FIG. 5, another alternative support design is shown. In particular, springs 19 may be disposed between the contact surfaces 16 and the support 14. As the vehicle testing apparatus 10 moves the support 14, an inertial force $F_I$ of the vehicle 12 is in an opposite direction of the movement of the support 14. The springs 19 allow the contact surfaces 16 to move based on the inertial force $F_I$ of the vehicle 12 to replicate the load of a specific profile on each wheel 20 during real-world driving situations.

The contact surfaces 16 can also be adjustable to accommodate vehicles 12 having various track widths. Additional contact surfaces 16 can be included to accommodate vehicles 12 having more than two axles, such as semi trucks. Further, semi-truck rollovers may require multiple vehicle testing apparatuses 10 to be used in series since a trailer and a cabin have at least two separate rigid bodies and they may each require an individual apparatus of their own for dynamic rollover simulation.

Turning back to FIGS. 1–3, the vehicle 12 is equipped with a computer-controlled steering system to control a turn angle of the wheels 20 during the vehicle rollover maneuver. The computer-controlled steering system is equipped with a servo actuator and a steering wheel angle instrument to measure an angle of movement of a steering wheel 22. The contact surfaces 16 can be free to rotate with minimum friction as the computer-controlled steering system rotates the wheels 20 during the vehicle rollover maneuver. A wheel angle instrument is included on the support 14 for measuring an angle of movement of the wheels 20 in response to movement of the steering wheel 22. A relationship between the steering wheel angle measurement and the wheel angle measurement is established to allow accurate control over the wheel angle by moving the steering wheel 22.

Additionally, a number of measurement devices 24, 26, 28 for measuring movement of the support 14 and the vehicle 12 are included on the support 14 and on the vehicle 12. The measurement devices 24, 26, 28 may all be mounted on the vehicle 12 or all mounted on the support 14 or both. The measurement devices 24, 26, 28 include at least one accelerometer 26 for measuring accelerations of the support 14 and the vehicle 12 in the three axes X, Y, Z. The support 14 can also experience forces in a first pivotal direction A, a second pivotal direction B, and a first rotational direction C. The measurement devices 24, 26, 28 further include at least one transducer 28 for measuring the forces in the first pivotal direction A, the second pivotal direction B, and the first rotational direction C. The measurement devices 24, 26, 28 further include instruments 24 such as a proximity sensor to measure a height of a body 32 of the vehicle 12 from the support 14, angular rate measurement devices to measure an angular velocity of the support 14 in the first A and second B pivotal directions and the first rotational direction C, and angular displacement sensors to measure the orientation of the support 14 and vehicle 12 in the directions A, B, and C.

Figure 9:
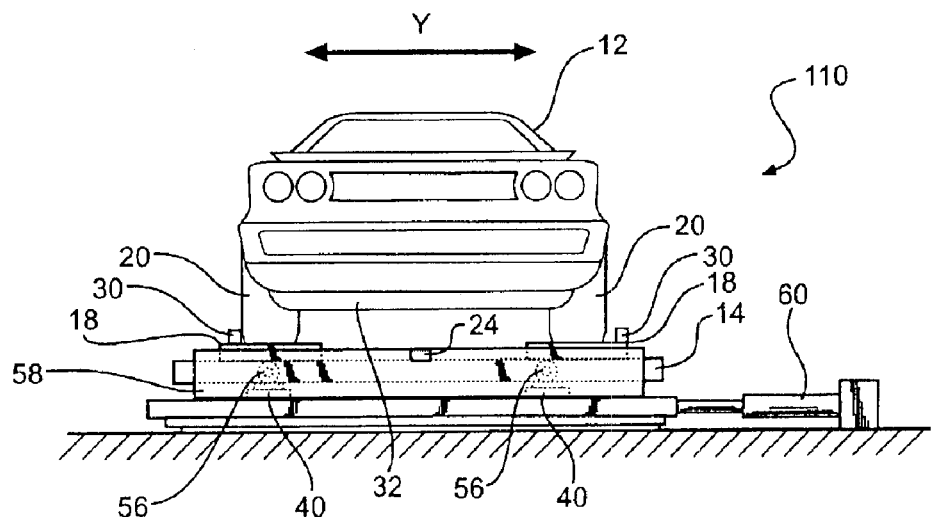
FIG. 9 is a rear view of the vehicle testing apparatus of FIG. 8.
Figure 10:
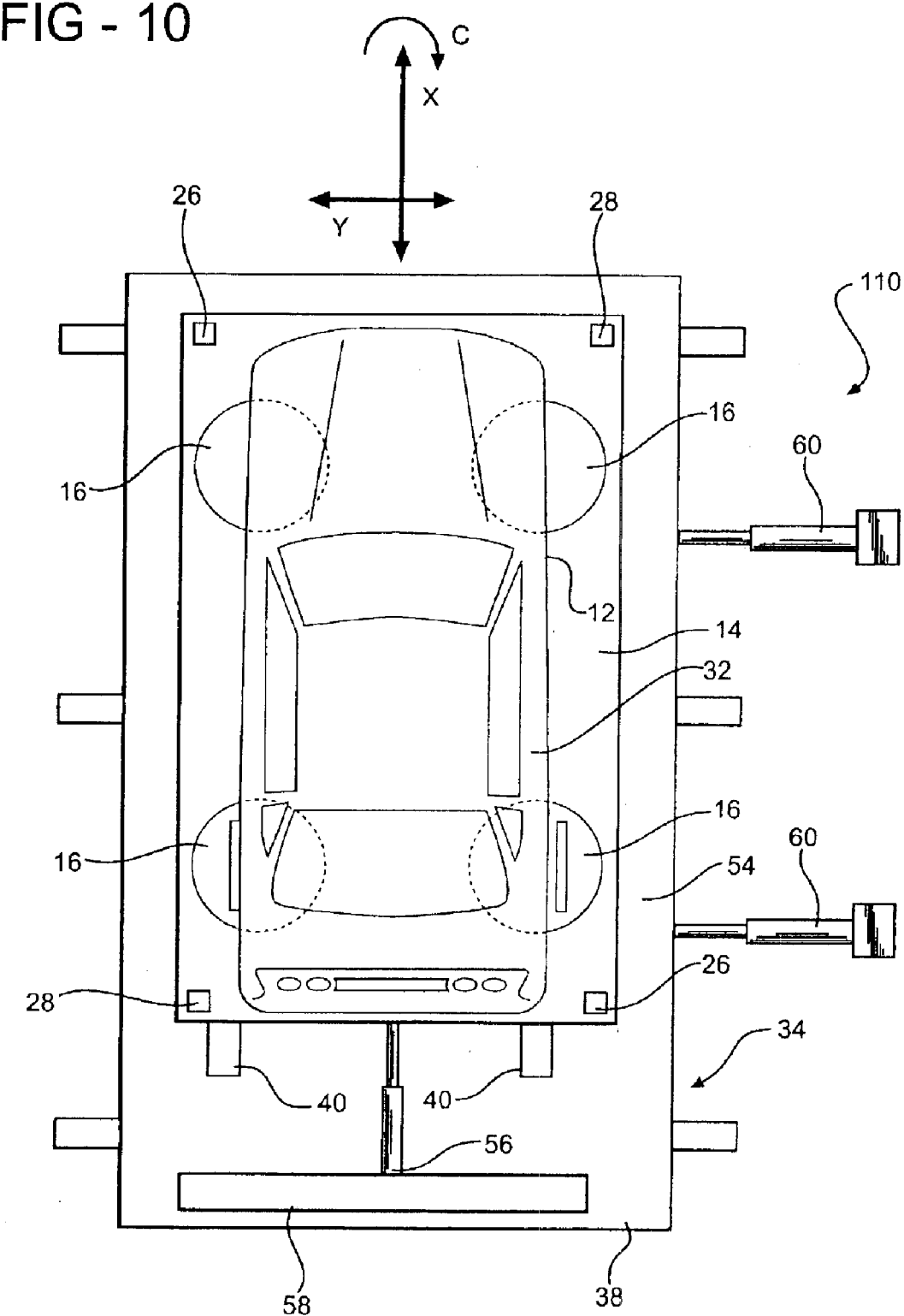
FIG. 10 is a top view of the vehicle testing apparatus of FIG. 8.

Preferably, one or more of the contact surfaces 16 include a tripping wall 30 extending vertically from the support 14 to conduct specific tripped rollover maneuvers. The tripping wall 30 prevents slippage of the wheels 20 during movement of the support 14 during tripped rollover simulations or when the maneuver requires some slip before being tripped. As shown in FIGS. 9 and 10, when some slip is required, the tripping wall 30 is positioned as a certain distance from the wheels 20. The tripping wall 30 creates a fulcrum at one or more of the wheels 20 of the vehicle 12 on the vehicle testing apparatus 10 to test the propensity of the vehicle 12 to rollover when tripped. Alternatively, the tripping wall 30 can be removed to test the propensity of the vehicle 12 to roll over without being tripped.

Figure 6:
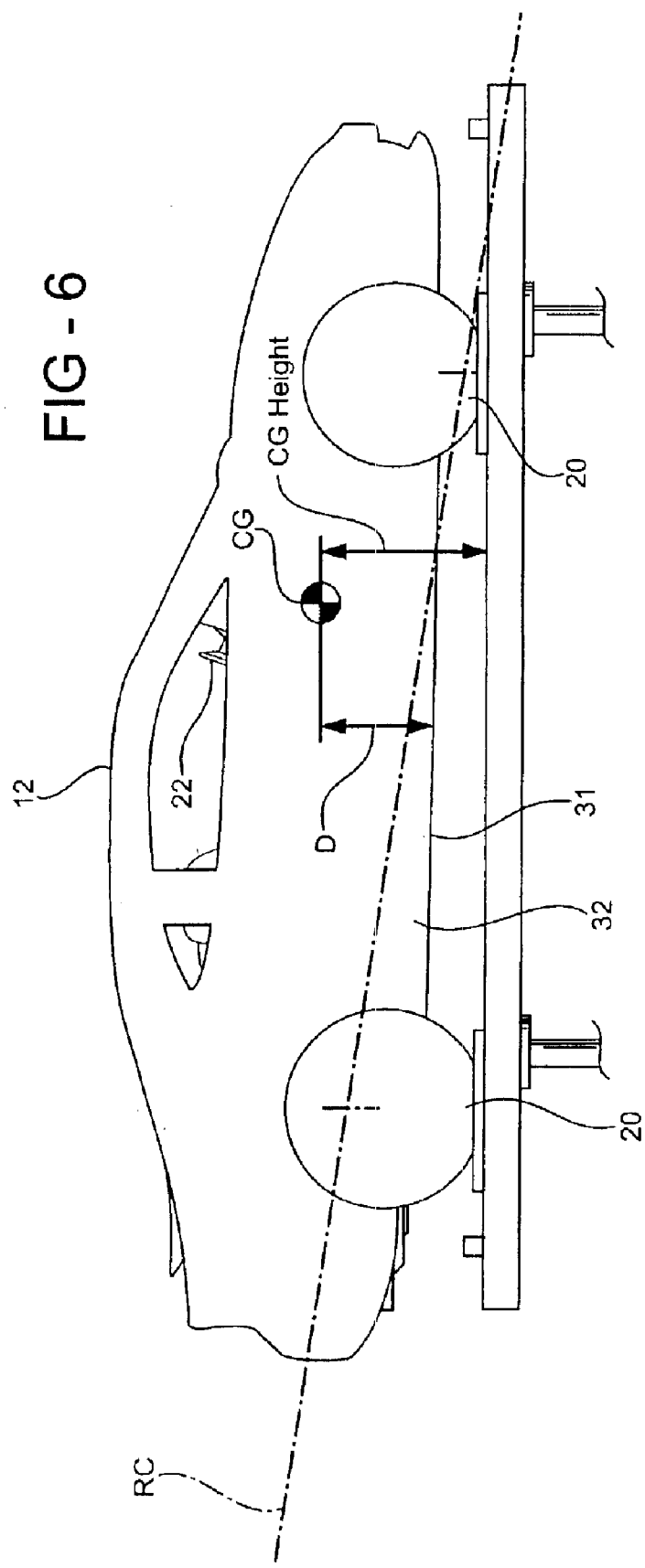
FIG. 6 is a side view of a vehicle illustrating various points of measurement relevant to a propensity of the vehicle to rollover.
Figure 7:
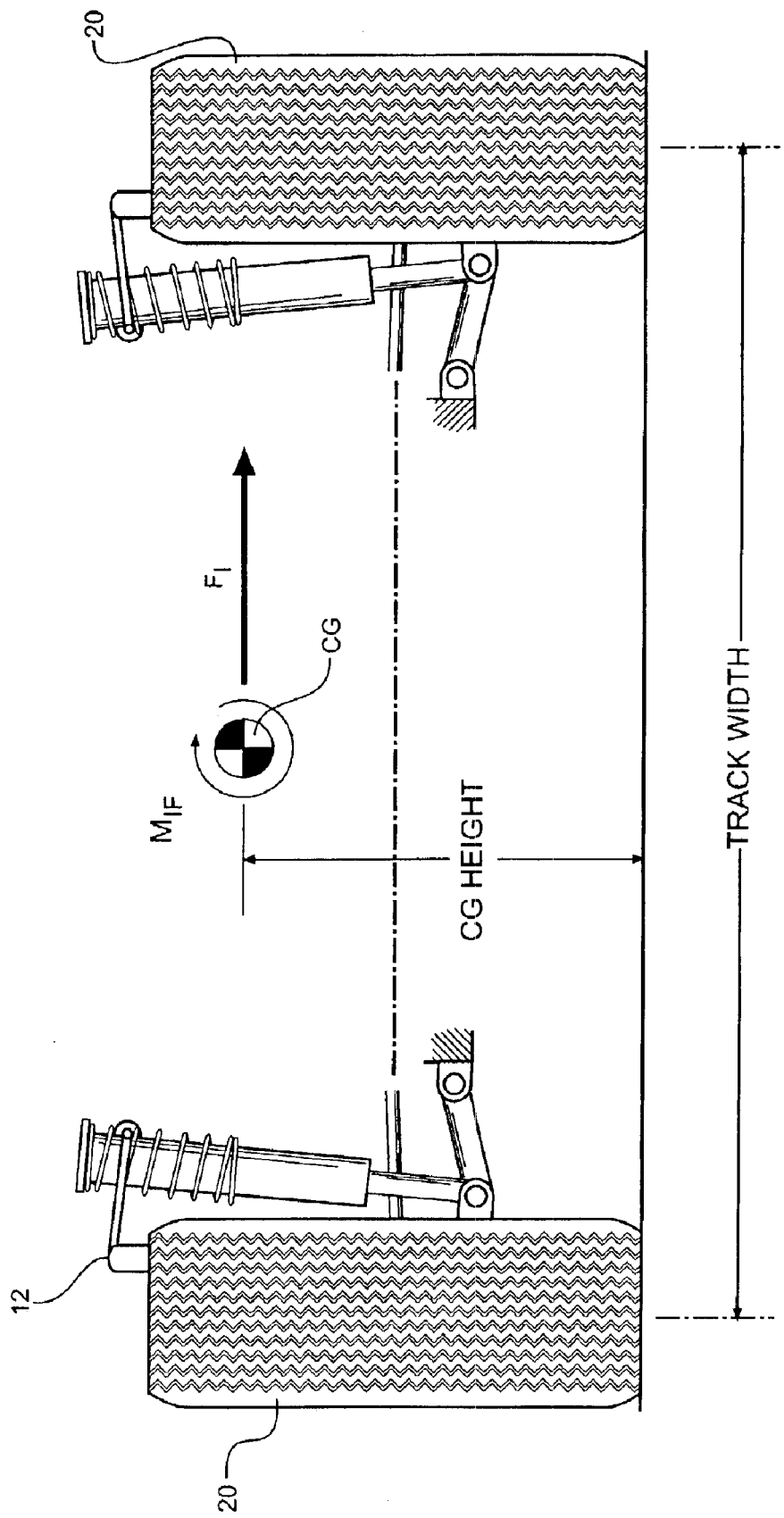
FIG. 7 is a partially fragmented planar front view of a wheel base and suspension of the vehicle illustrating additional points of measurement relevant to the propensity of the vehicle to rollover.

As best shown in FIGS. 6 and 7, during movement of the support 14, the inertial force $F_I$ of the vehicle 12, is in an opposite direction of the movement of the support 14. Wheel lift-off (FIG. 15) theoretically occurs when a moment of the inertial force $M_{IF}$ about the wheel 20 overcomes a vertical force of gravity on the vehicle 12. The moment of the inertial force $M_{IF}$ is measured at a center of gravity CG of the vehicle 12 using a center of gravity height CG Height. Many other factors also dictate the point at which the wheel lift-off will occur. Referring to FIG. 6, for example, a roll center RC is an axis about which the vehicle 12 rolls and is dependent on a type of suspension of the vehicle 12. The roll center RC is not easily predicted through calculations and is generally developed through real-world testing. In addition, a distance D from the center of gravity CG to a bottom 31 of the body 32 of the vehicle 12 also has an effect on wheel lift-off, as does the wheel angle of the vehicle 12 during movement of the support 14. Many other properties of the vehicle 12 also have an effect on wheel lift-off, and thus a propensity of the vehicle to rollover.

Referring back to FIGS. 1–3, a mechanism 34 is coupled to the support 14 for moving the support 14 along and around the three axes X, Y, Z. The three axes X, Y, Z are preferably perpendicular to one another. The mechanism 34 subjects the vehicle 12 to the compound force that is the result of simultaneous movements along and around any combination of the three axes X, Y, Z. The compound force is either in a linear direction that is along one of the three axes X, Y, Z or a combination of the three axes X, Y, Z, the first pivotal direction A, the second pivotal direction B, the first rotational direction C, or a combination of the first pivotal direction A, the second pivotal direction B, and the first rotational direction C, or a combination of the linear directions, pivotal directions, and rotational direction.

The mechanism 34 includes a first member 36 constrained for rectilinear movement along a first axis X of the axes X, Y, Z. Preferably, the first member 36 is a first platform 36, but can also be a first frame or any other body capable of supporting a weight of the vehicle 12 and the support 14 while being movable along the first axis X. The measurement devices 26, 28 can also be included on the first member 36. The mechanism 34 further includes a second member 38 constrained for rectilinear movement along the second axis Y of the axes X, Y, Z. The first axis X is horizontally disposed. Like the first member 36, the second member 38 is preferably a second platform 38, but can also be a second frame or any other body capable of supporting a weight of the vehicle 12, the support 14, and the first member 36 while being movable along the second axis Y. The second axis Y, like the first axis X, is horizontally disposed perpendicular to the first axis X. A third axis Z is a vertical axis.

Figure 16:
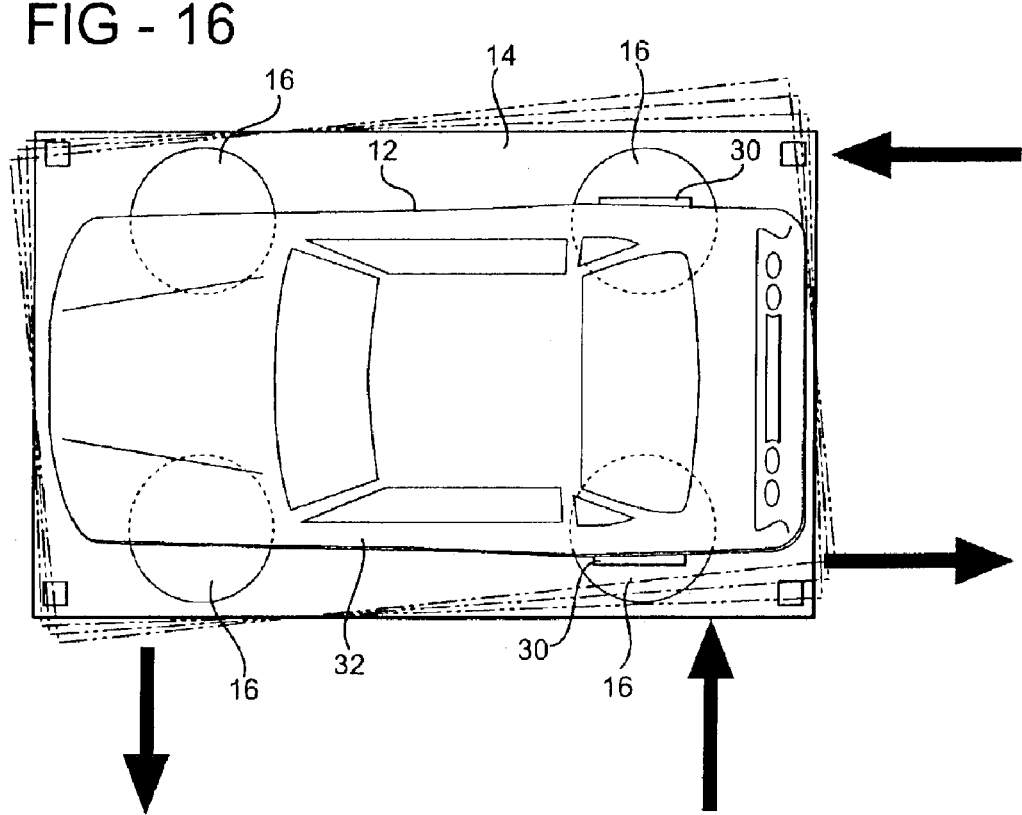
FIG. 16 is a top view of the vehicle testing apparatus of FIG. 1 with the support being rotatable about a first rotational axis.

As best shown in FIGS. 1–3 and 14, a first track 40 is disposed between the first member 36 and the second member 38 for providing the rectilinear movement of the first member 36 along the first axis X. The first track 40 includes at least one first rail 42 with a corresponding first slot 44. The first rail 42 is mounted to the first member 36. The first slot 44 receives the first rail 42. Preferably, the first track 40 includes additional first rails 42 with corresponding first slots 44 for providing the rectilinear movement of the first member 36 along the first axis X. As shown in FIG. 14, the first rails 42 are fixed to the first member 36 to prevent the first member 36 from rotating in the first rotational direction C. The first rails 42 may also be pivotally mounted to the first member 36 to allow the first member 36, and thus the support 14, to rotate in the first rotational direction C, as shown in FIG. 16.

A second track 46 supports the second member 38 for providing the rectilinear movement of the second member 38 along the second axis Y. Preferably, the second track 46 includes at least one second rail 48 and a corresponding second slot 50. The second rail 48 is mounted to the second member 38. The second slot 50 receives the second rail 48. Preferably, the second track 46 includes additional second rails 48 with corresponding second slots 50 for providing the rectilinear movement of the second member 38 along the second axis Y. As shown in FIG. 14, the second rails 48 are fixed to the second member 38 to prevent the second member 38 from rotating in the first rotational direction C. The second rails 48 may also be pivotally mounted to the second member 38 to allow the second member 38, and thus the first member 36 and the support 14, to rotate in the first rotational direction C, as shown in FIG. 16.

The mechanism 34 further includes at least one vertical actuator 52. The vertical actuator 52 is preferably a servo-hydraulic actuator or any piston-type actuator capable of supporting and moving the support 14 and the vehicle 12 installed on the vehicle testing apparatus 10. It should be appreciated that the actuator 52 can be of any suitable design including electrical. The first member 36 includes a top surface 54 to which the vertical actuator 52 is mounted. The vertical actuator 52 extends vertically between the first member 36 and the support 14 for moving the support 14 along the third axis Z relative to the first member 36. Preferably, the mechanism 34 includes at least two vertical actuators 52. The vertical actuators 52 are independently movable for moving the support 14 in at least one of the first pivotal direction A and the second pivotal direction B relative to the first member 36, in addition to moving the support 14 along the third axis Z relative to the first member 36. More preferably, as shown in FIG. 14, the mechanism 34 includes at least four vertical actuators 52. The vertical actuators 52 are independently movable for moving the support 14 along the third axis Z relative to the first member 36 and for moving the support 14 in the first pivotal direction A, the second pivotal direction B, or a combination of the first A and second B pivotal directions relative to the first member 36. As shown in FIG. 3, additional vertical actuators 52 can be included to provide additional support 14 depending on a type of vehicle 12 being tested on the vehicle testing apparatus 10. For example, a semi truck presents a heavier load than a normal passenger vehicle 12. Thus, the vehicle testing apparatus 10 having the semi truck may require additional vertical actuators 52 to support the heavier load.

The mechanism 34 further includes a first actuating device 56 for moving the first member 36 along the first axis X. The first actuating device 56 is any type of push/pull mechanism capable of moving the first member 36 along the first axis X. Preferably, the first actuating device 56 is a servo-hydraulic actuator. The first actuating device 56 reacts between the first member 36 and the second member 38 for moving the first member 36 relative to the second member 38 along the first axis X.

The second member 38 preferably includes a wall 58 extending upwardly therefrom. The first actuating device 56 is mounted between the wall 58 and the first member 36. The first actuating device 56 includes at least one longitudinal actuator 56 for moving the first member 36 along the first axis X. Preferably, the first actuating device 56 includes at least two longitudinal actuators 56 for moving the first member 36 along the first axis X and for moving the first member 36 in the first rotational direction C with respect to the second member 38, if desired. Preferably, the two longitudinal actuators 56 are independently movable for moving the first member 36 in the first rotational direction C relative to the second member 38, as shown in FIG. 16.

The mechanism 34 also includes a second actuating device 60 for moving the second member 38 along the second axis Y. The second actuating device 60 is any type of push/pull mechanism capable of moving the second member 38 along the second axis Y. Preferably, the second actuating device 60 is a servo-hydraulic actuator. The second actuating device 60 includes at least one lateral actuator 60 for moving the second member 38 along the second axis Y. Preferably, as shown in FIG. 2, the second actuating device 60 includes two lateral actuators 60 for moving the second member 38 along the second axis Y and in a first rotational direction C relative to a foundation 62, if desired.

Figure 8:
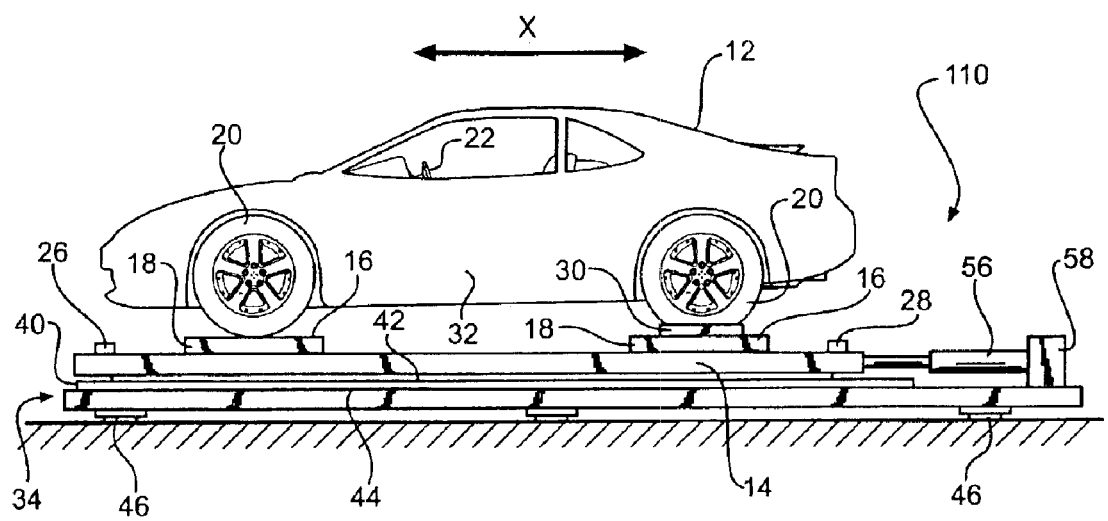
FIG. 8 is a side view of an alternative embodiment of the vehicle testing apparatus.

Referring to FIGS. 8–10, an alternative embodiment of the vehicle testing apparatus 110 includes the mechanism 34 coupled to the support 14. The first member 36 and the vertical actuators 52 are not included in this embodiment of the vehicle testing apparatus 110. The first actuating device 56 reacts between the second member 38 and the support 14 for moving the support 14 along the first axis X. As illustrated, the first actuating device 56 includes only a single longitudinal actuator 56. It should be appreciated that any suitable number of longitudinal actuators could be used in either of the embodiments. The second actuating device 60, as illustrated, includes two lateral actuators 60 for moving the second member 38 along the second axis Y and for rotating the second member 38 about the first rotational direction C. It has been found that additional power is required to move the vehicle testing apparatus 10, 110 in the lateral direction (Y axis). However, it should be appreciated that any suitable number of lateral actuators could be used in either of the embodiments. Although not required, the contact surface actuators 17, as shown in FIG. 4, can be included to control the contact surfaces 16. The contact surface actuators 17 can be positioned in any desired direction to move and control the forces on the contact surfaces 16 along multiple axes. As also illustrated, one of the tripping walls 30 is positioned a certain distance from the wheel 20.

The first rails 46 are mounted to the support 14 instead of to the first member 36. The first rails 46 and the second rails 48 are fixed to the support 14 and the second member 38, respectively, to prevent the second member 38 from rotating in the first rotational direction C. The first rails 46 and/or second rails 48 may be pivotally mounted to the support 14 and/or second member 38, respectively, to allow the support and/or the second member 38 to rotate in the first rotational direction C, as shown in FIG. 16. The remaining features previously and subsequently discussed are essentially identical between the preferred embodiment of FIGS. 1–3 and the alternative embodiment of FIGS. 8–10. It should be appreciated that the vehicle testing apparatus 10, 110 may be of any suitable design or configuration so long as the apparatus is capable of exciting the vehicle 12 in six degrees of freedom and optionally able to control tire reaction forces according to an arbitrarily defined criteria.

Figure 11A:
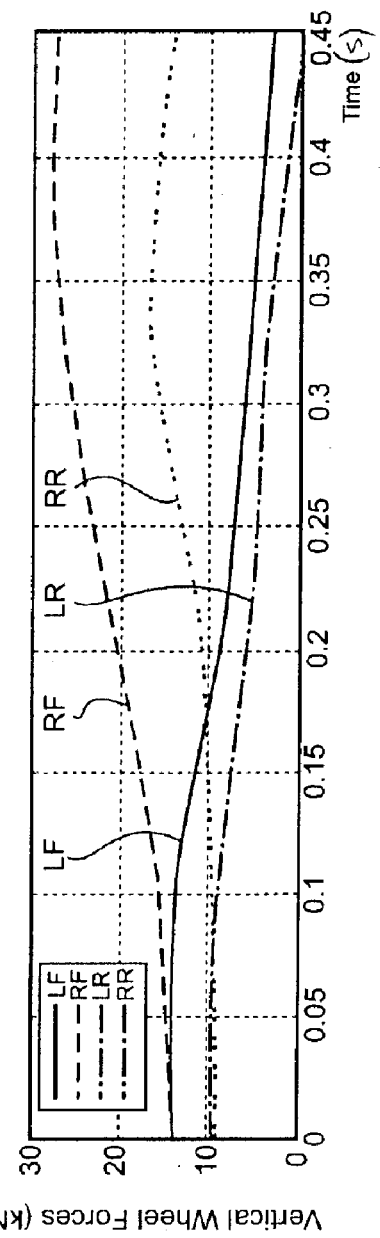
FIG. 11A is a graphical illustration of vertical wheel forces with respect to time for a J-turn vehicle rollover maneuver with braking of the vehicle at 75 kilometers per hour using the vehicle testing apparatus of FIG. 1.
Figure 11B:
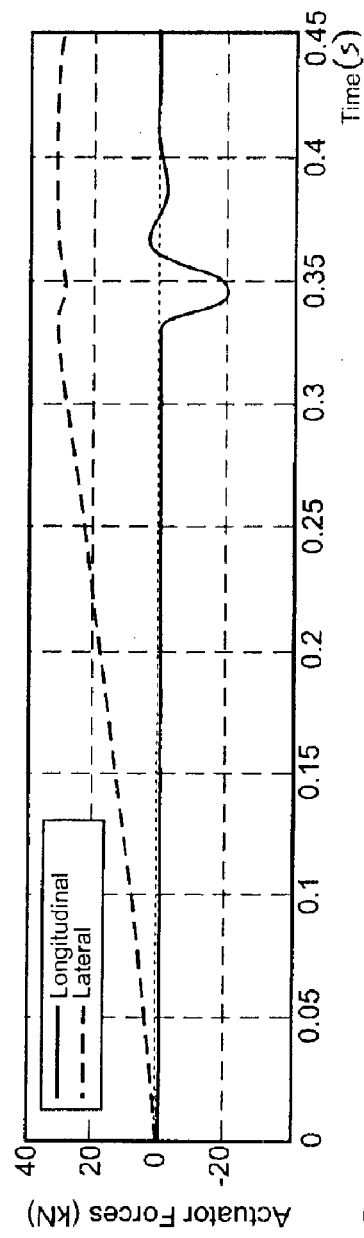
FIG. 11B is a graphical illustration of actuator forces with respect to time for the J-turn vehicle rollover maneuver with braking of the vehicle at 75 kilometers per hour using the vehicle testing apparatus of FIG. 1.
Figure 11C:
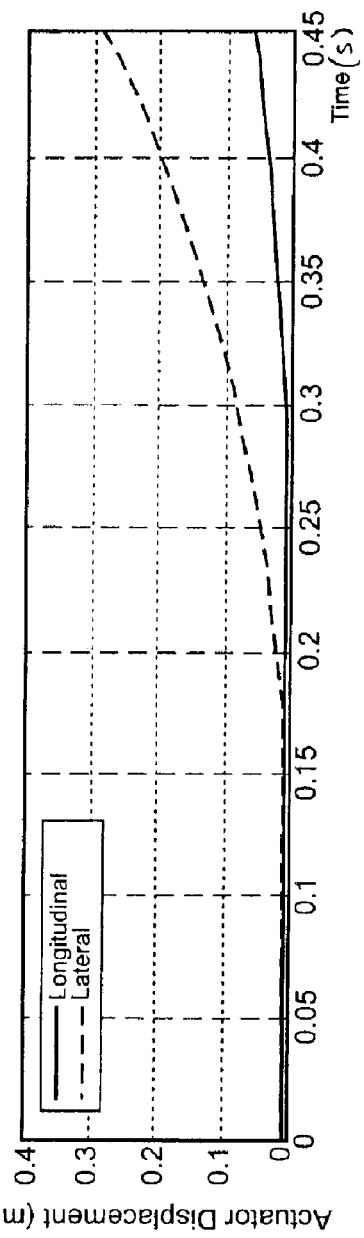
FIG. 11C is a graphical illustration of actuator displacement with respect to time for the J-turn vehicle rollover maneuver with braking of the vehicle at 75 kilometers per hour using the vehicle testing apparatus of FIG. 1.
Figure 12A:
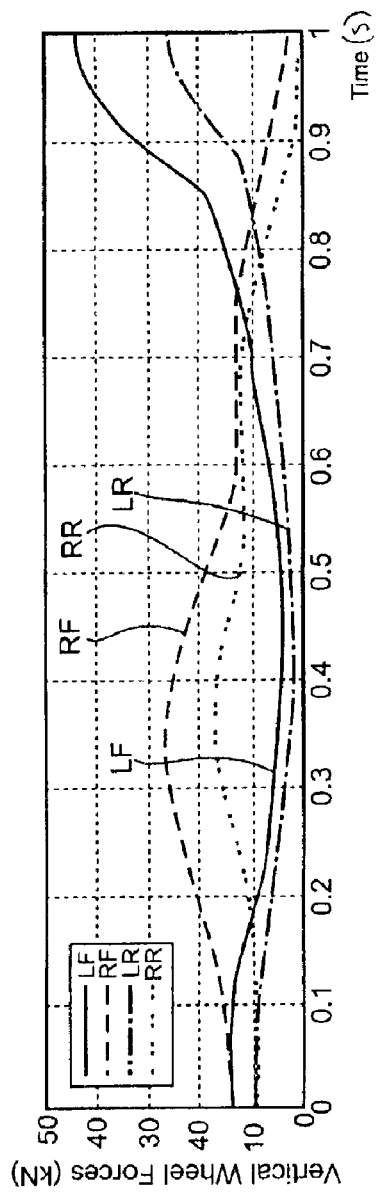
FIG. 12A is a graphical illustration of vertical wheel forces with respect to time for a fish hook vehicle rollover maneuver with braking of the vehicle at 75 kilometers per hour using the vehicle testing apparatus of FIG. 1.
Figure 12B:
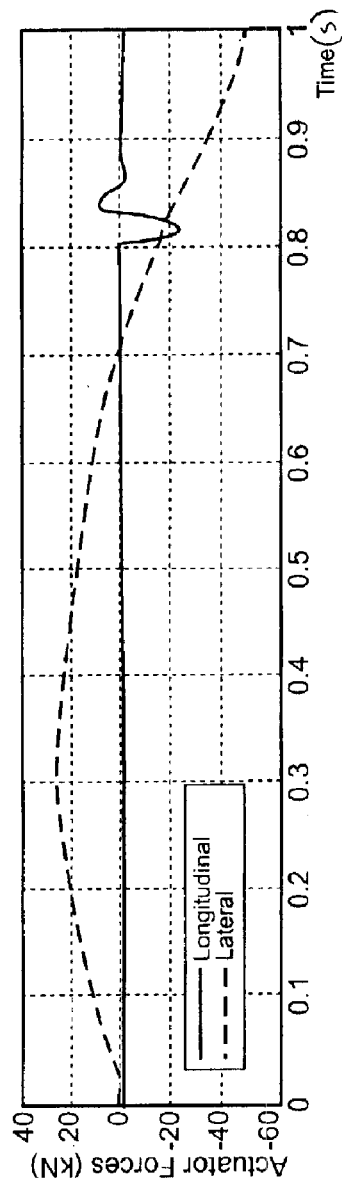
FIG. 12B is a graphical illustration of actuator forces with respect to time for the fish hook vehicle rollover maneuver with braking of the vehicle at 75 kilometers per hour using the vehicle testing apparatus of FIG. 1.
Figure 12C:
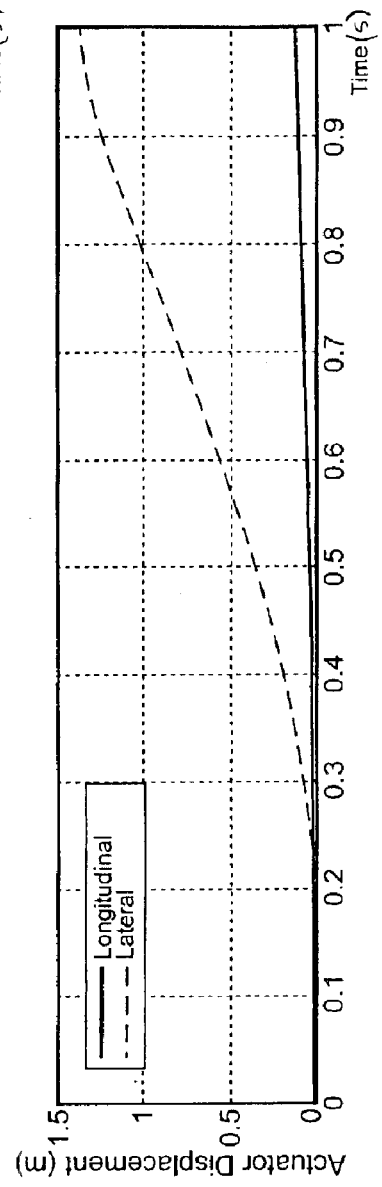
FIG. 12C is a graphical illustration of actuator displacement with respect to time for the fish hook vehicle rollover maneuver with braking of the vehicle at 75 kilometers per hour using the vehicle testing apparatus of FIG. 1.
Figure 13A:
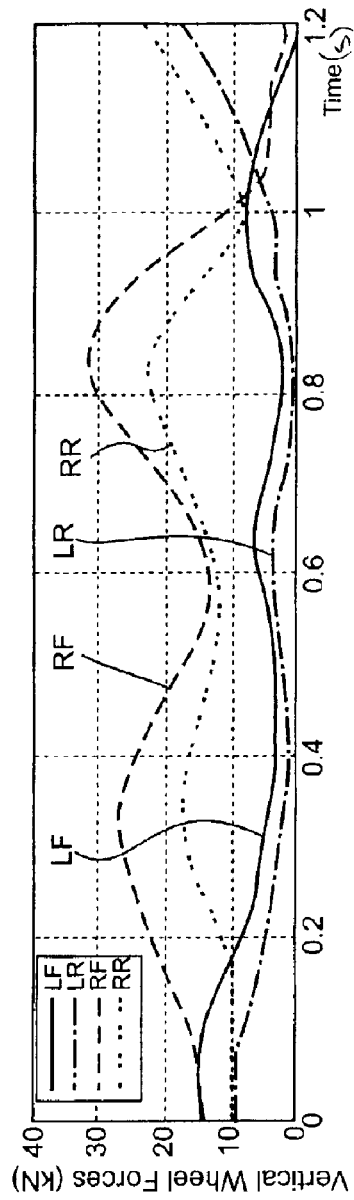
FIG. 13A is a graphical illustration of vertical wheel forces with respect to time for a resonant steer vehicle rollover maneuver of the vehicle at 120 kilometers per hour using the vehicle testing apparatus of FIG. 1.
Figure 13B:
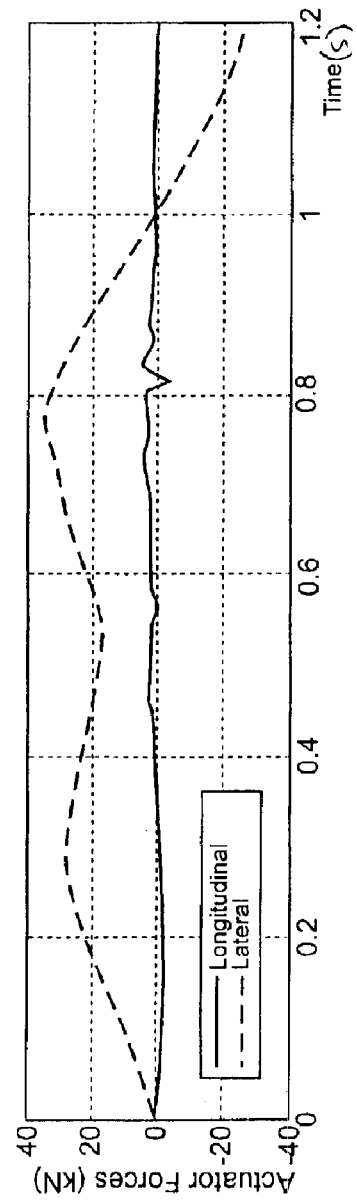
FIG. 13B is a graphical illustration of actuator forces with respect to time for the resonant steer vehicle rollover maneuver of the vehicle at 120 kilometers per hour using the vehicle testing apparatus of FIG. 1.
Figure 13C:
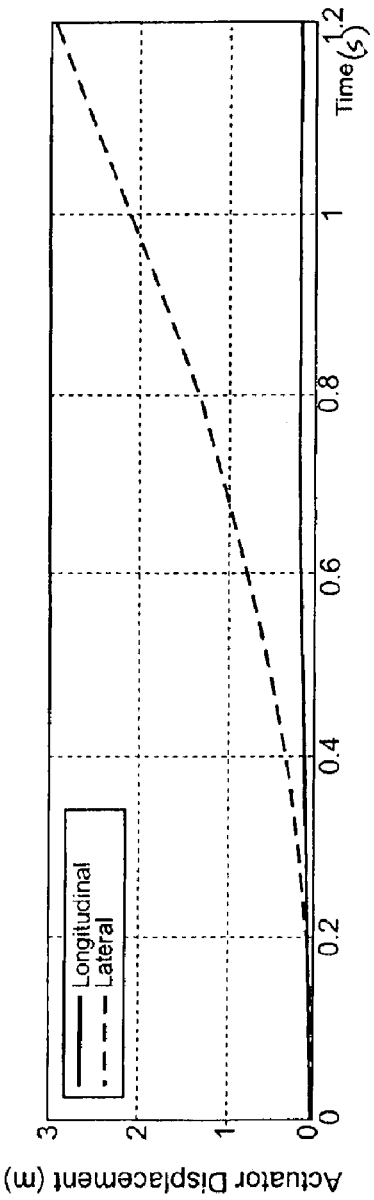
FIG. 13C is a graphical illustration of actuator displacement with respect to time for the resonant steer vehicle rollover maneuver of the vehicle at 120 kilometers per hour using the vehicle testing apparatus of FIG. 1.

The vehicle testing apparatuses 10, 110 further include a controller for sending control signals to the mechanism 34 for moving the support 14. The controller regulates movement of the vertical actuators 52, the first actuating device 56, and the second actuating device 60 to produce a desired motion of the support 14. The controller can also send control signals to the computer controlled steering system. Referring to FIGS. 11 through 13, the controller can send signals to the vertical actuators 52, the first actuating device 56, and the second actuating device 60, as well as the computer controlled steering system, to create an actuator displacement over a period of time. The controller moves the vertical actuators 52, the first actuating device 56, the second actuating device 60, and the computer controlled steering system depending on the vehicle rollover maneuver or vehicle characterization test to be performed. For example, FIG. 11C shows a graphical illustration of actuator displacement with respect to time for a J-turn vehicle rollover maneuver with braking of the vehicle 12 at 75 kilometers per hour. Although a vertical displacement is not indicated, it is to be appreciated that a vertical displacement can be factored into other vehicle rollover maneuvers that are simulated for uneven or sloppy terrain. FIG. 11B is a graphical illustration of actuator forces required to create the actuator displacement with respect to time for the vertical actuators 52, the first actuating device 56, and the second actuating device 60. FIG. 11A is a graphical illustration of vertical wheel forces with respect to time. Thus, at any given time in FIGS. 11A through 11C, actuator displacement, actuator forces, and vertical wheel forces are shown. A point of wheel lift-off is indicated in FIG. 11A when the vertical wheel forces is zero. Many other vehicle rollover maneuvers can be tested with the vehicle testing apparatuses 10, 110. For example, FIGS. 12A through 12C and 13A through 13C show similar graphical illustrations of actuator displacement, actuator forces, and vertical wheel forces as FIGS. 11A through 11C but for a fish hook vehicle rollover maneuver with braking of the vehicle 12 at 75 kilometers per hour and for a resonant steer vehicle rollover maneuver of the vehicle 12 at 120 kilometers per hour, respectively. These types of maneuvers are well know in the art and as such will not be discussed in any greater detail.

Figure 17:
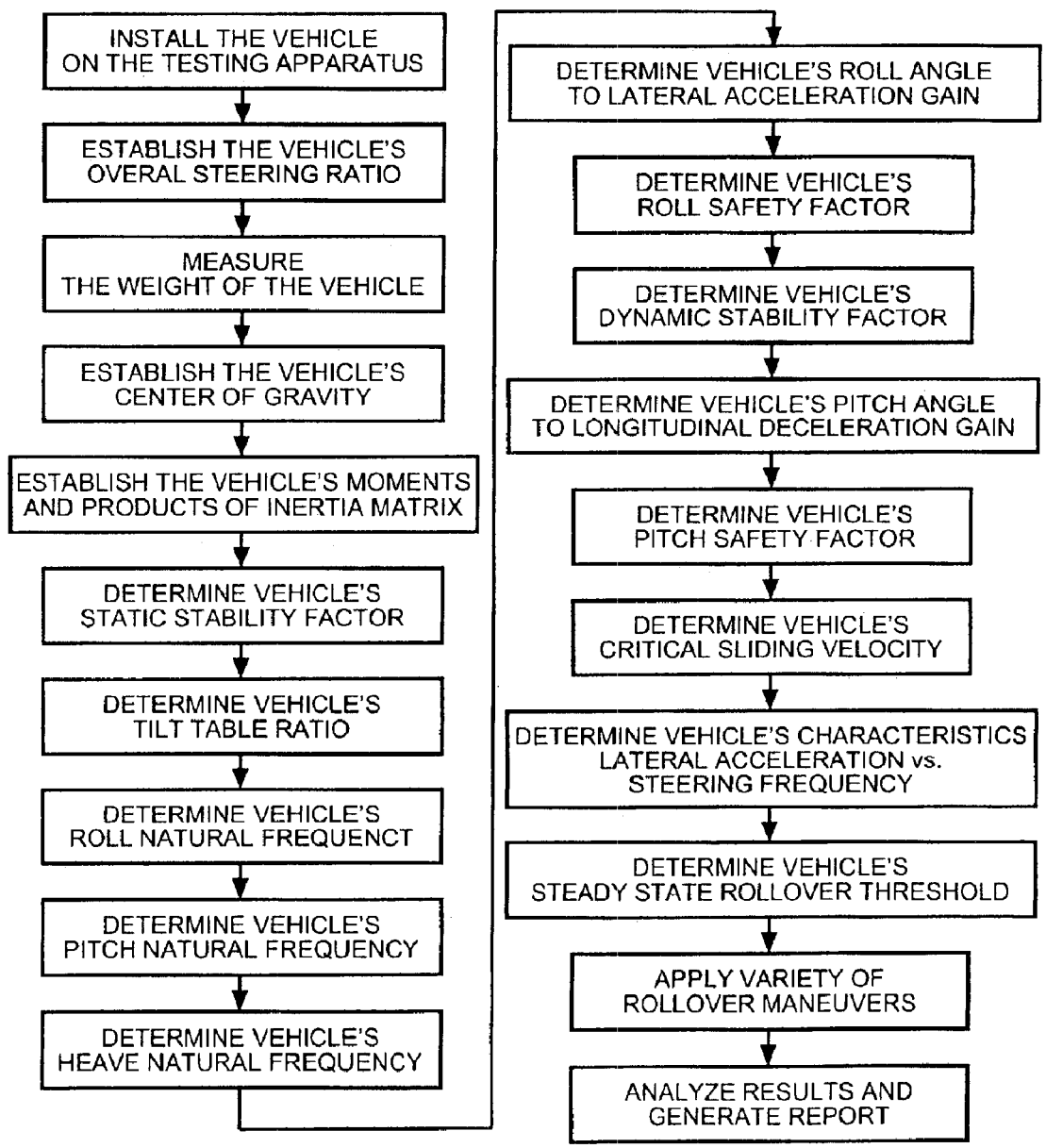
FIG. 17 is a flow diagram illustrating the steps included in a method of the subject invention.

Referring to FIG. 17, a particular method 64 of replicating a real-world vehicle rollover of the vehicle 12 is shown through a series of steps. Preferably, the vehicle rollover is preferably defined by at least one of the wheels of the vehicle lifting off of the support. Further, the method 64 preferably utilizes the vehicle testing apparatuses 10, 110 described above. The vehicle testing apparatuses 10, 110 are calibrated to ensure that the controller and measurement devices 24, 26, 28 are functional and in perfect working order. The contact surfaces 16 are adjusted according to measurements of the track width and wheel base of the vehicle 12 such that each wheel 20 will align with one of the contact surfaces 16. The vehicle 12 is then positioned on the vehicle testing apparatus 10, 110 such that each of the wheels 20 are supported on the support 14. In particular, each wheel 20 is positioned on a corresponding contact surface 16.

The vehicle 12 is inspected and parameters such as tire pressure, fuel level, number of dummies used for driver and passengers, the payload used in a trunk, etc are all recorded. Variations in the parameters allow testing to be performed for many different scenarios.

The vehicle's overall steering ratio is now established. In particular, the relationship between the steering wheel angle measurement and the wheel angle measurement is established. The contact surfaces 16 can be optionally designed to rotate freely with the wheels 20. The steering wheel 22 is given a ramp input while the rotation of the contact surfaces 16 is measured.

A number of static properties of the vehicle 12 are determined by moving the support 14 into various static positions. The movement of the support 14 into these various static positions can be done before a test is performed. A number of dynamic properties of the vehicle 12 can also be determined by moving the support 14 before performing a test. The measurement devices 24, 26, 28 can be used to determine the dynamic properties of the vehicle 12 as the support 14 moves. The static and dynamic properties of the vehicle can be determined in any desired order.

The static properties can include a weight measurement of the vehicle 12. For the vehicle testing apparatus 10 that includes the vertical actuators 52, the weight measurement is performed by bringing the support 14 into a perfectly horizontal position. For the alternative embodiment of the vehicle testing apparatus 110, the support 14 is already in a perfectly horizontal position. A weight of the wheels 20 positioned on each of the contact surfaces 16 is measured for determining a weight of the vehicle 12. Based on contact surface weight measurements, the weight measurement of the vehicle 12 is obtained. In particular, the sensors 18 of the contact surfaces 16 sense a weight of the wheels 20 positioned on the corresponding contact surfaces 16.

The contact surface weight measurements also provide a basis for determining a location of the center of gravity CG of the vehicle 12, which is another static property. A weight distribution of the vehicle 12 on the support 14 produces variations between the contact surface weight measurements at each contact surface 16. The location of the center of gravity CG is determined based on those variations. Another static property is the height of the center of gravity. To obtain the height of the center of gravity CG Height, the support 14 is brought to a slight ramp configuration to achieve an angle between the support 14 and the first member 36. The ramp configuration shifts the weight distribution of the vehicle 12 on the support 14. The sensors 18 of the contact surfaces 16 sense a new set of contact surface measurements, in combination with the contact surface measurements taken with the support 14 in the perfectly horizontal position, are used to calculate the height of the center of gravity CG Height through well-established equations. A static stability factor (SSF), another static property, is calculable based on a well known equation involving the track width and the location of the center of gravity CG.

A Title Table Ratio (TTR), yet another static property, is determined by moving the support 14 in the second pivotal direction B to a point where a zero weight is measured by the sensors 18 on the contact surfaces 16 on one side of the vehicle 12. The sensors 18 of the contact surfaces 16 may not indicate a zero weight at a same point. Hence two values are used to mark the points where a zero weight is distributed on the contact surfaces 16 on each side of the vehicle 12. The TTR is determined for both sides of the vehicle 12.

For testing the dynamic properties of the vehicle, which as discussed above, may be done before the testing, a moment and product of inertia matrix is developed for the vehicle 12 through dynamic tests that include exciting the vehicle 12 with constant accelerations along each of the three axes X, Y, Z long enough for the vehicle 12 to respond to the excitements. In other words, the dynamic properties are determined by moving the support along one or more of the axes X, Y, Z. The vehicle 12 can also be excited with constant accelerations in the first A and second B pivotal directions and the first rotational direction C. The sensors 18 of the contact surfaces 16 each sense a weight of the wheels 20 during each of the accelerations, which is used to develop the moment and product of inertia matrix. The inertia matrix is symmetric with 6 unknowns. The constant accelerations along each of the three axes X, Y, Z and the constant accelerations in the first A and second B pivotal directions and the first rotational direction C provide six independent well known equations representing rigid body dynamics required to solve for the inertia matrix.

A roll, pitch, and heave natural frequency of the vehicle 12, which are other dynamic properties, can also be measured. A constant amplitude sinusoidal slow sweep is applied to the support 14 including the vehicle 12. For the roll natural frequency, the vertical actuators 52 move the support in the second pivotal direction B around the center of gravity CG of the vehicle 12. For the pitch natural frequency, the vertical actuators 52 move the support 14 in the first pivotal direction A around the center of gravity CG of the vehicle 12. For the heave natural frequency, the vertical actuators 52 move the support 14 along the third axis (Z). For each of the roll, pitch, and heave natural frequencies, the frequency at which an oscillation magnitude of the vehicle 12 has a highest magnitude marks the roll, pitch, and heave natural frequencies, respectively, of the vehicle 12.

Another dynamic property is a roll angle to lateral acceleration gain which is measured by accelerating the support 14 including the vehicle 12 along the second axis (Y). An acceleration magnitude is started at 0.1 g and gradually increased until a point where wheel lift-off occurs. The wheels 20 are tripped to achieve the wheel lift-off. At each acceleration along the second axis (Y), a variation of a maximum roll angle is recorded. Eventually, gain characteristics are obtained in a form of curves. The roll angle to lateral acceleration gain is measured for accelerations in both directions along the second axis (Y).

A Roll Safety Factor (RSF) is the acceleration magnitude along the second axis (Y) at the point of wheel lift-off. A Dynamic Stability Factor (DSF) is a ratio of lateral force, corresponding to the acceleration magnitude along the second axis (Y) at the point of wheel lift-off, to the weight measurement of the vehicle 12. Both the RSF and DSF are dynamic properties which can be recorded.

A pitch angle to longitudinal deceleration gain, yet another dynamic property, is measured by decelerating the support 14 including the vehicle 12 along the first axis (X). A deceleration magnitude is started at 0.1 g and gradually increased until a point where wheel lift-off occurs. The wheels 20 are tripped to achieve the wheel lift-off. At each deceleration along the first axis (X), a variation of a maximum pitch angle is recorded. Eventually, gain characteristics are obtained in a form of curves. The pitch angle to lateral acceleration gain is measured for accelerations in both directions along the first axis (X). The dynamic property of a Pitch Safety Factor (PSF) is the deceleration magnitude along the first axis (X) at the point of wheel lift-off.

The dynamic property of a Critical Sliding Velocity (CSV) is measured by accelerating the support 14 along the second axis (Y) until a target velocity is reached and allowing the support 14 to coast until the vehicle 12 is steady. The support 14 is then suddenly brought to a halt. The support 14 is repeatedly accelerated to gradually increasing velocities until wheel lift-off occurs. The tripping walls 30 allow wheel lift-off to occur without allowing the wheels 20 to slide. The velocity at which wheel lift-off occurs marks the CSV. A CSV is measured for vehicle in both directions along the second axis (Y). A similar test could also be optionally implemented while a limited slip is allowed before the trip occurs.

It should be appreciated that fewer than all of the static and dynamic tests outlined above could be used when actuating the vehicle testing apparatus 10, 110. In addition, it should be appreciated that additional vehicle characteristics can also be measured. For example, a lateral acceleration vs. steering frequency test can be performed. For this test, the vehicle testing apparatus 10, 110 actuates the support 14 to replicate a prescribed road, which has constant curves or a desired oscillating acceleration profile. The vehicle 12 is subjected to a number of test runs, following the same prescribed road each time but at an increased velocity each time. The steering wheel 22 is given a slow sinusoidal sweep signal of constant magnitude during the test. A maximum lateral acceleration reached during a test run at a distinct steering frequency value marks a point in a vehicle characteristic plot. This vehicle characteristic plot is useful in determining the initial set of forces and moments for the real-world vehicle rollover.

Steady State Rollover Threshold (SSRT) can also be measured. The vehicle testing apparatus 10, 110 actuates the support 14 to replicate a prescribed road having a single sharp curve. The vehicle 12 is subjected to a number of test runs, following the same prescribed road each time but at an increased velocity each time. To follow the prescribed road, the steering wheel 22 is kept at a constant angle during the test. A maximum lateral acceleration reached when at least one wheel 20 lifts off of the corresponding contact surface 16 marks the SSRT. The SSRT is useful in determining the initial set of forces and moments for the real-world vehicle rollover.

Figure 18:
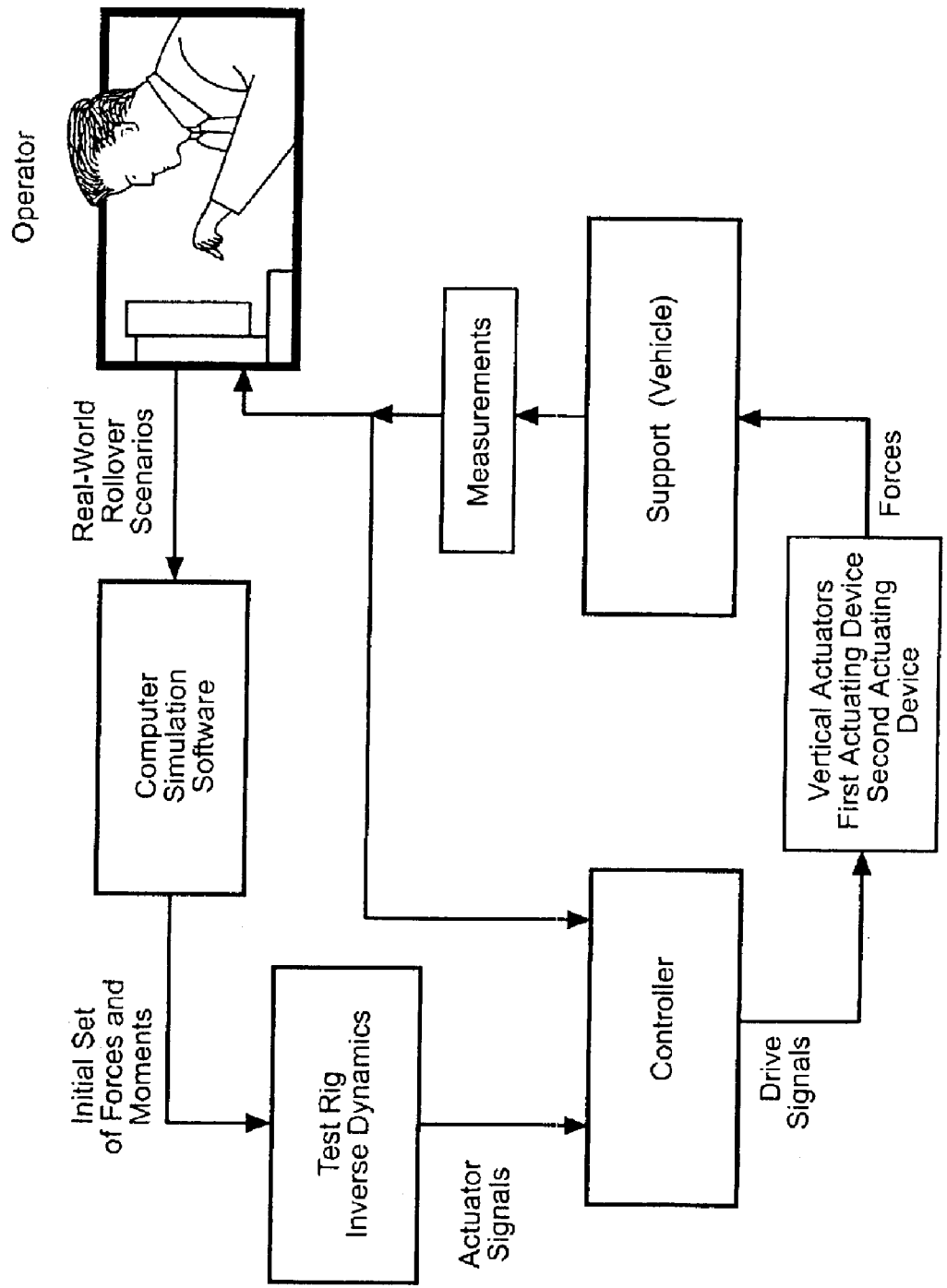
FIG. 18 is a flow diagram illustrating the general steps used to implement the method of the subject invention.

Referring to FIG. 18, an initial set of forces and moments are determined based on at least the static properties of the vehicle 12. A number of real-world vehicle rollover scenarios and/or desired acceleration profiles can be tested. Preferably, one of the real-world vehicle rollover scenarios is selected by an operator. The vehicle rollover scenarios can be a J turn, a J turn with braking, a fish hook, a fish hook with braking, a resonant steer maneuver, a double lane change, a split-mu situation, etc. The desired acceleration profiles could be in a template developed to condense the most critical rollover excitations into a few maneuvers. The static properties are inputted by the operator. Alternatively, dynamic properties of the vehicle can also be inputted by the operator. The inputted properties along with the selected vehicle rollover scenario are sent to a computer simulation software.

Preferably, the computer simulator program determines an initial set of forces and moments to replicate the real-world rollover on the vehicle testing apparatus 10, 110 based on at least the determined static properties of the vehicle 12 or a set fixed criteria. In addition to the inputted properties, parameters associated with the real-world vehicle rollover situation, such as vehicle speed, steering wheel variation, brake application profile, etc. can be adjusted in the computer simulator program. The computer simulator program produces a simulated vehicle rollover maneuver, which includes forces and moments that the vehicle 12 experiences during the simulated vehicle rollover maneuver. However, the computer simulator program cannot factor all real-world conditions into the simulated vehicle rollover, and therefore will not produce exact results. Nevertheless the vehicle testing apparatus 10 can apply the same excitations to a set of vehicles and vehicle response can display the vehicle's overall performance in terms of its rollover propensity. Due to the objectivity and the repeatability of the system, the method allows the tested set of vehicles to be ranked according to their rollover performance within all possible operation ranges. The forces and moments from the simulated vehicle rollover can become the initial set of forces and moments to be applied to the vehicle testing apparatus 10, 110. It should be appreciated that the initial set of forces and moments could alternatively be determined from other computer related programs of even from manual tables, charts, and the like.

The initial set of forces and moments are preferably inputted into a calculation algorithm, called Test Rig Inverse Dynamics (TRID), before actuating the vehicle testing apparatus 10, 110. The TRID is specific to a geometry and instrumentation of the vehicle testing apparatus 10, 110. The TRID converts the initial set of forces and moments into actuator signals. The actuator signals are fed to a real-time controller for generating drive signals to control the vertical actuators 52, the first actuating device 56, and the second actuating device 60.

Figure 19:
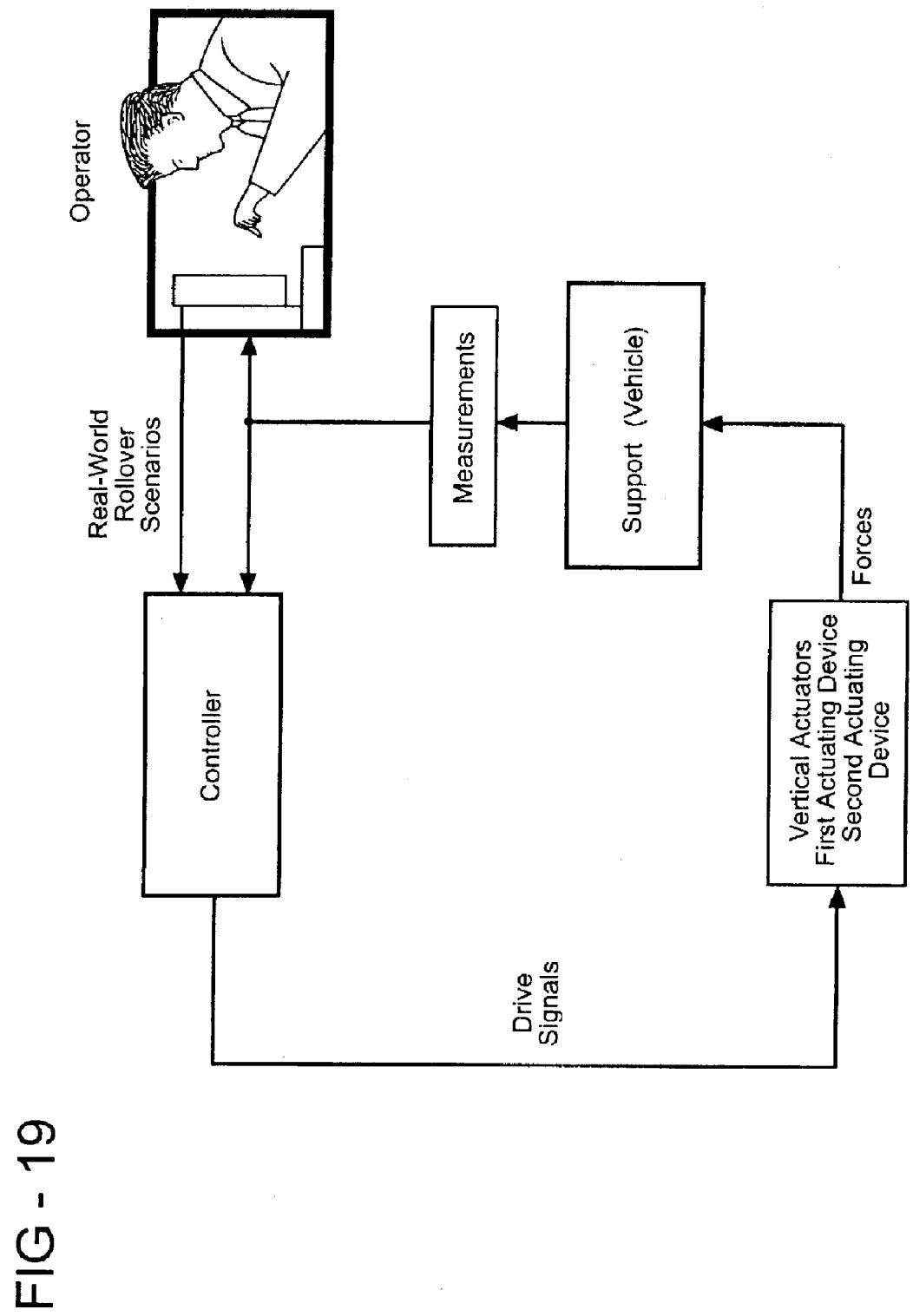
FIG. 19 is an alternative flow diagram illustrating the general steps used to implement an alternative method of the subject invention.

Referring to FIG. 19, an alternative method of the subject invention is disclosed. In particular, the computer simulation program and the TRID are eliminated. The operator can manually feed a desired excitation profile into the controller of the vehicle testing apparatus 10, 110. In other words, the operator can manually feed any set of forces and moments and/or actuation signals and then update the inputs based upon the performance of the vehicle testing apparatus 10, 110. Hence the vehicle's response to a simple iteration could be carried out until critical threshold values are generated across the operation range of the vehicle 12.

The vehicle testing apparatus 10, 110 is actuated based upon the initial set of forces and moments to replicate the vehicle rollover. In particular, at least the first actuating device 56 and the second actuating device 60 actuate the vehicle testing apparatus 10, 110 based upon the initial set of forces and moments to replicate the vehicle rollover. Preferably, the vertical actuators 52 would also be actuated. As stated above, drive signals are used to control the vertical actuators 52, the first actuating device 56, and the second actuating device 60. As also set forth above, a first axis X is positioned in a horizontal plane relative to the vehicle testing apparatus 10, 110 and a second axis Y is positioned in the horizontal plane relative to the vehicle testing apparatus 10, 110 perpendicular to the first axis X. There is also a third axis Z positioned perpendicular to the horizontal plane. The actuation of the vehicle testing apparatus 10, 110 is preferably defined as actuating the support along the first axis X, the second axis Y, and/or the third axis Z. In particular, the actuation of the vehicle testing apparatus 10, 110 is further defined as simultaneously actuating the support 14 along both the first axis X and the second axis Y. Alternatively, the actuation of the vehicle testing apparatus 10 is further defined as simultaneously actuating the support along both the first axis X and the third axis Z. As another alternative, the actuation of the vehicle testing apparatus 10 is further defined as simultaneously actuating the support along both the second axis Y and the third axis Z. As yet another alternative, the actuation of the vehicle testing apparatus 10 is further defined as simultaneously actuating the support along and around the first axis X, the second axis Y, and the third axis Z.

Preferably, the measurement devices 24, 26, 28 measure an actual response of the vehicle to the initial set of forces and moments transferred to the vehicle through the wheels 20 to determine the dynamic properties of the vehicle during the vehicle rollover. It should be appreciated that any suitable device could be used to measure the actual response of the vehicle. The measuring of the actual response of the vehicle 12 is further defined as determining if at least one of the wheels 20 lifted off of the support 14. Preferably, the measuring the actual response of the vehicle 12 is further defined as determining if at least one of the wheels 20 is no longer positioned on the corresponding contact surface 16 during a tripped maneuver. Even more preferably, the step of determining if at least one of the wheels 20 is no longer positioned on the corresponding contact surface 16 is further defined by sensing a weight of the wheels 20 positioned on the corresponding contact surfaces 16. In particular, the sensors 18, which can be positioned in either or both of the wheels 20 and contact surfaces 16, measure a weight distribution of the wheels 20 on the corresponding contact surfaces 16 during the actuation based on the initial set of forces and moments. Wheel lift-off can be indicated, during a tripped rollover maneuver, if at least one of the sensors 18 measures a zero weight on the corresponding contact surface 16 at any point. Thus, during a tripped rollover maneuver, the sensors 18 determine if at least one of the wheels 20 lifted off of the corresponding contact surface 16 during the actuation based on the initial set of forces and moments. When there is limited slip allowed, there are several ways of sensing the wheel lift such as using proximity sensors to detect the clearance of the chassis from the support, detecting vertical acceleration, using angular displacement sensors to measure the orientation of the chassis or any comparable method. The sensors 18 and measurement devices 24, 28, 28 feed the dynamic properties and actual response of the vehicle 12 to the initial set of forces and moments both back to the operator to analyze the results and generate a report and back to the controller to close a feedback control loop.

So long as all of the wheels 20 remained on the support during the initial actuating of the vehicle testing apparatus 10, 110, the controller then determines a second set of forces and moments to be applied to the vehicle testing apparatus 10, 110. In other words, a second set of forces and moments are determined so long as none of the wheels 20 are lifted off of the contact surfaces 16. The second set of forces and moments are based upon the determined initial set of forces and moments, the measured actual response of the vehicle 12 to the initial actuating of the vehicle testing apparatus 10, 110, and the determined dynamic properties of the vehicle 12. The controller generates a second set of drive signals for controlling the vertical actuators 52, the first actuating device 56, and the second actuating device 60. The vertical actuators 52, the first actuating device 56, and the second actuating device 60 then actuate the support 14 based upon the second set of forces and moments to further replicate the vehicle rollover. The second actuating of the vehicle testing apparatus 10, 110 can be the exact same actuation as the first or initial or could include alternative or additional maneuvers. A second actual response of the vehicle 12 to the second actuating of the vehicle testing apparatus 10, 110 is measured to further determine the dynamic properties of the vehicle 12 and the propensity of the vehicle 12 to rollover. These measurements can be done in the same manner as described above.

Sets of forces and moments to be applied to the support 14 can be repeatedly determined so long as all of the wheels 20 remain on the support 14. Furthermore, the support 14 can be repeatedly actuated based upon the repeatedly determined set of forces and moments until at least one wheel 20 lifts off of the support 14 to further replicate the vehicle rollover and to determine the propensity of the vehicle 12 to rollover. Thus, exact forces and moments to cause a particular vehicle to rollover can be produced and recorded to establish a standard for measuring the propensity of the particular vehicle 12 to rollover. In addition, various types of rollover scenarios can be performed on the same vehicle in successive order. Further, subsequent rollover maneuvers can be made more aggressive, if desired. Hence, the dynamics of a vehicle can be tested for various different scenarios in a variety of ways. The method of the subject invention provides a reliable, repeatable, and objective test to determine the propensity of a particular vehicle or class of vehicles to rollover.

Obviously, many modifications and variations of the present invention are possible in light of the above teachings and the invention may be practiced otherwise than as specifically described within the scope of the appended claims.

What is claimed is:

1. A method of replicating a real-world vehicle rollover of a vehicle having wheels utilizing a vehicle testing apparatus having a support wherein the vehicle rollover is defined by at least one of the wheels lifting off of the support, said method comprising the steps of:
   positioning the vehicle on the vehicle testing apparatus such that each of the wheels of the vehicle are supported on the support;
   determining static properties of the vehicle;
   determining an initial set of forces and moments to be applied to the vehicle testing apparatus based upon the determined static properties;
   actuating the vehicle testing apparatus based upon the initial set of forces and moments to replicate the vehicle rollover;
   measuring an actual response of the vehicle to the initial actuating of the vehicle testing apparatus to determine dynamic properties of the vehicle;
   determining a second set of forces and moments to be applied to the vehicle testing apparatus so long as all of the wheels remained on the support during the initial actuating of the vehicle testing apparatus with the second set of forces and moments based upon the determined initial set of forces and moments, the measured actual response of the vehicle to the initial actuating of the vehicle testing apparatus, and the determined dynamic properties of the vehicle; and
   actuating the vehicle testing apparatus based upon the second set of forces and moments to further replicate the vehicle rollover.

2. A method as set forth in claim 1 further including the step of measuring a second actual response of the vehicle to the second actuating of the vehicle testing apparatus to further determine the dynamic properties of the vehicle and the propensity of the vehicle to rollover.

3. A method as set forth in claim 2 wherein the step of measuring the actual response of the vehicle is further defined as determining if at least one of the wheels lifted off of the support.

4. A method as set forth in claim 1 wherein the support includes a plurality of contact surfaces and wherein the step of positioning the vehicle on the vehicle testing apparatus is further defined as positioning each wheel on a corresponding contact surface.

5. A method as set forth in claim 4 wherein the step of measuring the actual response of the vehicle is further defined as determining if at least one of the wheels is no longer positioned on the corresponding contact surface.

6. A method as set forth in claim 5 wherein the step of determining if at least one of the wheels is no longer positioned on the corresponding contact surface is further defined by sensing a weight of the wheels positioned on the corresponding contact surfaces.

7. A method as set forth in claim 4 wherein the step of determining the static properties of the vehicle is further defined as measuring a weight of the wheels positioned on each of the contact surfaces for determining a weight of the vehicle.

8. A method as set forth in claim 1 further including the step of determining if at least one of the wheels lifted off of the support.

9. A method as set forth in claim 1 further including the step of repeatedly determining sets of forces and moments to be applied to the vehicle testing apparatus so long as all of the wheels remain on the support.

10. A method as set forth in claim 9 further including the step of repeatedly actuating the vehicle testing apparatus based upon the repeatedly determined set of forces and moments until at least one wheel lifts off of the support to further replicate the vehicle rollover and to determine the propensity of the vehicle to rollover.

11. A method as set forth in claim 1 wherein the step of determining the static properties of the vehicle is further defined as moving the support into various static positions to determine the static properties of the vehicle.

12. A method as set forth in claim 1 further including a computer simulator program and wherein the step of determining the initial set of forces and moments is further defined as inputting the determined static properties into the computer simulator program.

13. A method as set forth in claim 1 further including a first axis (X) positioned in a horizontal plane relative to the vehicle testing apparatus and wherein the steps of actuating the vehicle testing apparatus are further defined as actuating the support along the first axis (X).

14. A method as set forth in claim 13 further including a second axis (Y) positioned in the horizontal plane relative to the vehicle testing apparatus and perpendicular to the first axis (X) and wherein the steps of actuating the vehicle testing apparatus are further defined as actuating the support along the second axis (Y).

15. A method as set forth in claim 14 wherein the steps of actuating the vehicle testing apparatus are further defined as simultaneously actuating the support along both the first axis (X) and the second axis (Y).

16. A method as set forth in claim 13 further including a third axis (Z) positioned perpendicular to the horizontal plane and wherein the steps of actuating the vehicle testing apparatus are further defined as simultaneously actuating the support along both the first axis (X) and the third axis (Z).

17. A method as set forth in claim 14 further including a third axis (Z) positioned perpendicular to the plane and wherein the steps of actuating the vehicle testing apparatus are further defined as simultaneously actuating the support along both the second axis (Y) and the third axis (Z).

18. A method as set forth in claim 15 further including a third axis (Z) positioned perpendicular to the plane and wherein the steps of actuating the vehicle testing apparatus are further defined as simultaneously actuating the support along the first axis (X), the second axis (Y), and the third axis (Z).

19. A method as set forth in claim 1 wherein the vehicle testing apparatus includes measurement devices and wherein the step of measuring the actual response of the vehicle is further defined as measuring the actual response of the vehicle with the measurement devices to determine the dynamic properties of the vehicle.

20. A method as set forth in claim 1 further including the step of determining dynamic properties of the vehicle.

21. A method as set forth in claim 20 wherein the step of determining the dynamic properties of the vehicle is further defined as moving the support to determine the dynamic properties of the vehicle.

22. A method as set forth in claim 20 wherein the vehicle testing apparatus includes measurement devices and wherein the step of determining the dynamic properties of the vehicle is further defined as determining the dynamic properties of the vehicle with the measurement devices.

23. A method as set forth in claim 1 further including a calculation algorithm and further including the step of inputting the determined initial set of forces and moments into the calculation algorithm before actuating the vehicle testing apparatus.

24. A method as set forth in claim 23 further including the step of converting the initial set of forces and moments into actuator signals.

* * * * *